US011528883B2

(12) United States Patent
Cantwell et al.

(10) Patent No.: US 11,528,883 B2
(45) Date of Patent: Dec. 20, 2022

(54) ANIMAL CRATE WITH SWING OR DROP DOOR ASSEMBLY

(71) Applicant: Mid-West Metal Products Company, Inc., Muncie, IN (US)

(72) Inventors: Brad Cantwell, Muncie, IN (US); Stew Kerr, Muncie, IN (US); Michael E. Greene, Muncie, IN (US); David J. Nolley, Muncie, IN (US)

(73) Assignee: Mid-West Metal Products Company, Inc., Muncie, IN (US)

( * ) Notice: Subject to any disclaimer, the term of this patent is extended or adjusted under 35 U.S.C. 154(b) by 76 days.

(21) Appl. No.: 16/940,640

(22) Filed: Jul. 28, 2020

(65) Prior Publication Data

US 2020/0354999 A1    Nov. 12, 2020

Related U.S. Application Data

(63) Continuation of application No. 15/464,571, filed on Mar. 21, 2017, now Pat. No. 10,738,515.
(Continued)

(51) Int. Cl.
| | | |
|---|---|---|
| *A01K 1/03* | (2006.01) | |
| *A01K 31/02* | (2006.01) | |
| *A01K 1/00* | (2006.01) | |
| *A01K 1/02* | (2006.01) | |
| *E05C 1/10* | (2006.01) | |

(Continued)

(52) U.S. Cl.
CPC ............ *A01K 1/034* (2013.01); *A01K 1/0035* (2013.01); *A01K 1/0058* (2013.01); *A01K 1/0064* (2013.01); *A01K 1/0245* (2013.01); *A01K 1/032* (2013.01); *A01K 31/02* (2013.01); *E05C 1/10* (2013.01); *E05C 5/02* (2013.01);
(Continued)

(58) Field of Classification Search
CPC .. A01K 1/0035; A01K 1/0058; A01K 1/0064; A01K 1/02; A01K 1/0236; A01K 1/0245; A01K 1/03; A01K 1/031; A01K 1/032; A01K 1/033; A01K 1/034; A01K 31/02; E05C 5/02; E05C 1/04; E05C 19/006; E05C 1/08; E05C 1/10; E05C 15/16; E06B 3/36; E06B 3/38; E06B 11/021; E05B 2015/1692
USPC .................................................. 119/416–501
See application file for complete search history.

(56) References Cited

U.S. PATENT DOCUMENTS

| | | | |
|---|---|---|---|
| 3,556,058 A | * | 1/1971 | Smiler ..................... A01K 1/03 |
| | | | 119/474 |
| 6,192,834 B1 | | 2/2001 | Kolozsvari |

(Continued)

*Primary Examiner* — Kathleen I Alker
(74) *Attorney, Agent, or Firm* — Taft Stettinius & Hollister LLP; Stephen F. Rost

(57) ABSTRACT

A door assembly includes a frame having interconnected wires that define an opening for an animal to pass therethrough, and a door having interconnected wires and being coupled to the frame. A latch assembly has a handle structure and a pin. The handle structure is pivotable with respect to one of the door and the frame, and the pin is movable axially with respect to one of the door and the frame. A first wire of the plurality of wires of the frame forms a key hole assembly. The key hole assembly defines an aperture for receiving the pin when the door is in a latched position with respect to the frame. A tab assembly is formed by at least one wire of the door and is disposable behind at least one of the plurality of wires of the frame in the closed position.

17 Claims, 26 Drawing Sheets

Related U.S. Application Data

(60) Provisional application No. 62/320,048, filed on Apr. 8, 2016.

(51) Int. Cl.
    *E05C 5/02*         (2006.01)
    *E05D 15/16*      (2006.01)
    *E06B 3/36*        (2006.01)
    *E06B 3/38*        (2006.01)

(52) U.S. Cl.
    CPC ............... *E05D 15/16* (2013.01); *E06B 3/36* (2013.01); *E06B 3/38* (2013.01)

(56) References Cited

U.S. PATENT DOCUMENTS

| | | | |
|---|---|---|---|
| 6,230,655 B1* | 5/2001 | Cohen | A01K 31/02 |
| | | | 119/459 |
| 6,681,720 B1* | 1/2004 | Skurdalsvold | A01K 1/03 |
| | | | 119/474 |
| 7,918,188 B1 | 4/2011 | Harper | |
| 8,960,730 B2* | 2/2015 | Kelly | A01K 1/035 |
| | | | 292/2 |
| 2012/0227328 A1* | 9/2012 | Link | E06B 3/34 |
| | | | 49/394 |
| 2014/0109839 A1 | 4/2014 | Cantwell | |
| 2014/0216354 A1* | 8/2014 | Cantwell | E04H 17/02 |
| | | | 119/481 |
| 2016/0024824 A1* | 1/2016 | Link | A01K 1/03 |
| | | | 119/481 |
| 2019/0063122 A1* | 2/2019 | McDaid | A01K 1/0035 |

\* cited by examiner

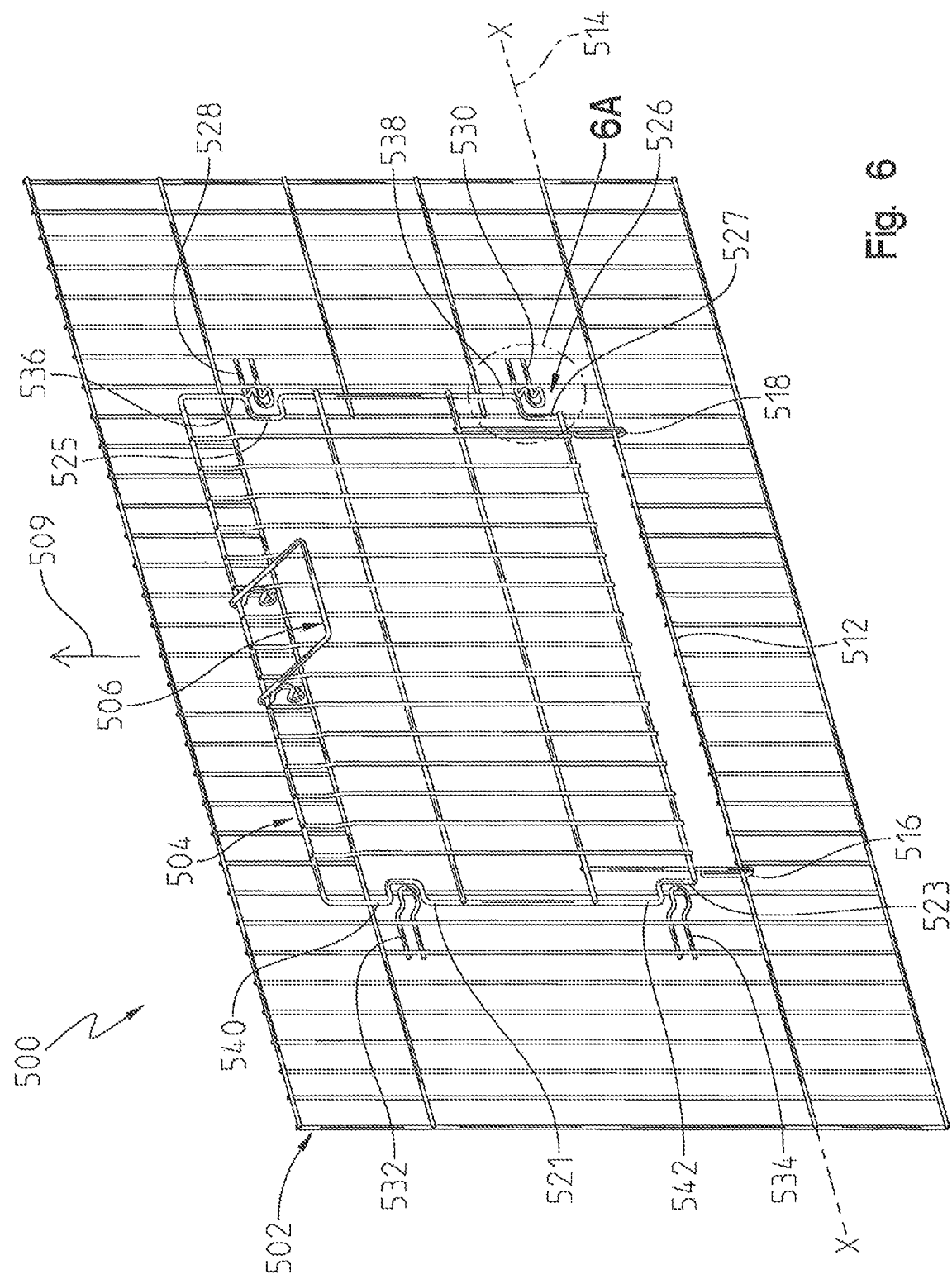

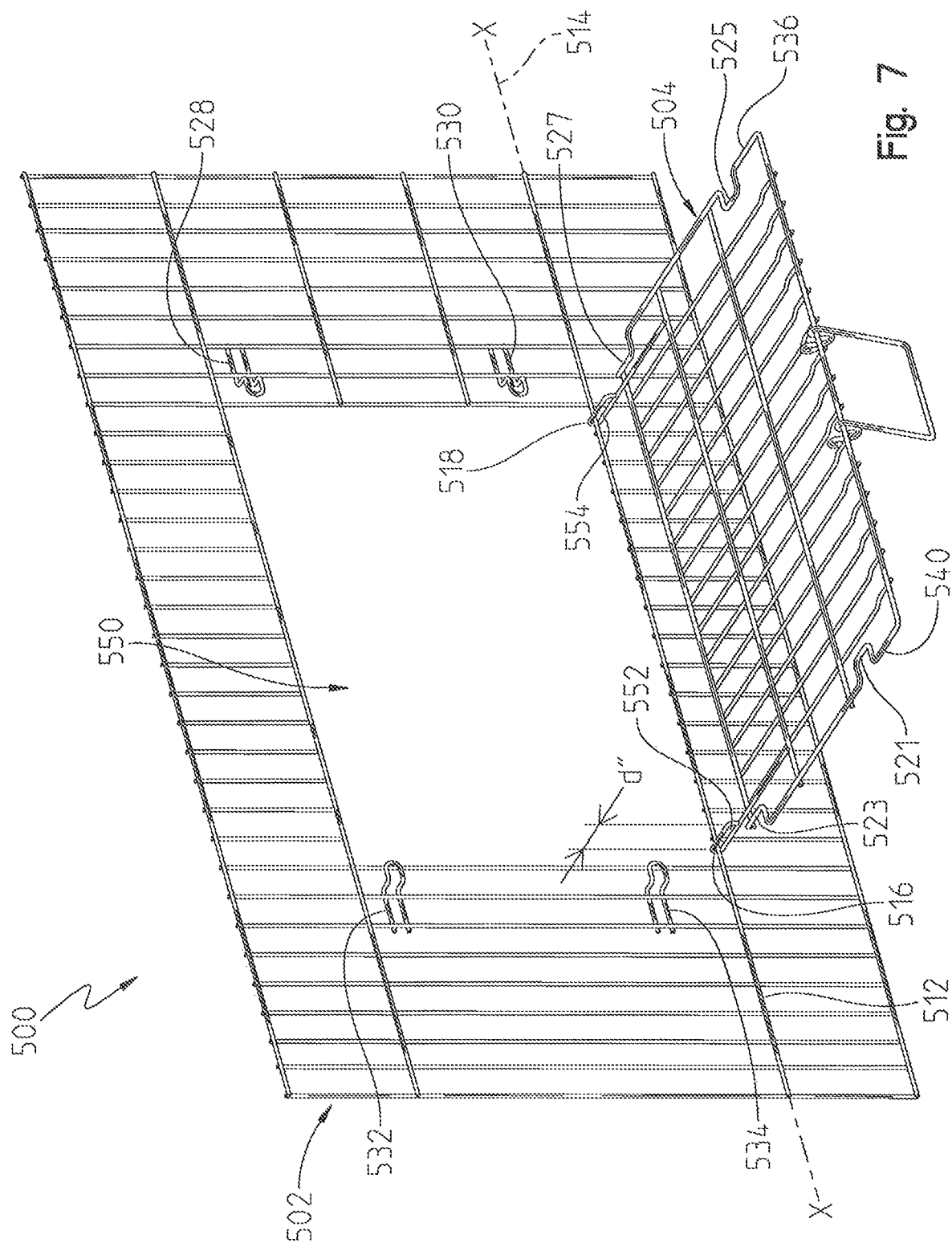

ANIMAL CRATE WITH SWING OR DROP DOOR ASSEMBLY

RELATED APPLICATIONS

The present application is a continuation of U.S. patent application Ser. No. 15/464,571, filed Mar. 21, 2017, which claims the benefit of U.S. Provisional Application Ser. No. 62/320,048, filed Apr. 8, 2016, the disclosures of which are hereby incorporated by reference in their entirety.

FIELD OF TUE DISCLOSURE

The present disclosure relates to an animal enclosure, and, in particular, to an animal crate having a swinging door or a drop door.

BACKGROUND

The use of animal cages or crate is well known, Many conventional cages have been developed over the years for housing animals of different shapes and sizes. For instance, animal cages typically house dogs and cats. Rabbits, rodents and other small animals have also been known to be housed by such cages and are quite common. In fact, such cages are also used for farm, animals when needed, including ducks and chickens. As cages have been further developed, the portability and ease of use have become points of emphasis. Some conventional cages, for example, have been designed to collapse to a compact structure for portability. Others have been designed to be of light weight and from durable materials. Conventional cages have been designed for ease of transporting an animal. Some conventional cages are designed as exercise pens that provide an interior space that the animal can move about, particularly outdoors.

Most conventional cages include at least one door for providing access to the interior of the cage. The animal enters or exits the cage through an opening when the door is opened, and the animal can be safely contained in the cage when the door is closed, Many conventional cages include a door that is attached to the cage with a hinge. In some conventional cages, the doors swing from a side of the cage and in others the door swings from the bottom or top of the cage. This allows the door to be swung from a closed position to an open and vice versa. In cages with side or top swinging doors, the animal can walk into the cage. In cages with bottom swinging doors, the animal is typically placed into and removed from the cage by the owner. A variety of latches have been incorporated into the design of the door to allow a user to open, close, and or securely latch the door.

Many of these conventional designs have limitations, however. With regards to an exercise pen, for example, the door is generally formed by an entire height and width of a panel or side member of the pen. Many of these doors are not able to be securely latched or may not prevent an animal from escaping the enclosure. In addition, due to the size of the door, it can be difficult for an owner to reach into the interior of the exercise pen and retrieve a desired animal when two or more animals are enclosed therein.

Therefore, a need exists for an improved animal enclosure that provides better means for accessing the interior of the enclosure which overcomes some of the above-mentioned limitations in the prior art.

SUMMARY

In one embodiment of the present disclosure, an animal enclosure includes a plurality of members defining an interior of the enclosure, where the plurality of members includes at least a first member; a frame of the first member having a plurality of interconnected wires that define an opening for an animal to pass therethrough and to enter or exit the interior of the enclosure; a door of the first member having a plurality of interconnected wires and being coupled to the frame, the door being pivotable about a pivot wire of the frame to move between an open position and a closed position, a latch assembly having a handle structure and a pin, where the handle structure is pivotable with respect to one of the door and the frame, and the pin is movable axially with respect to one of the door and the frame; a first wire of the plurality of wires of the frame forming a key hole assembly, the key hole assembly defining an aperture for receiving the pin when the door is in a latched position with respect to the frame; and a tab assembly formed by at least one wire of the door, the tab assembly being disposable behind one of the plurality of wires of the frame in the closed position.

In one example of this embodiment, the key hole assembly includes a portion of the first wire at a location between a first end and a second of the first wire. In a second example, the key hole assembly includes a first portion, a second portion, and a third portion, the first portion being integrally coupled with the first wire via a first bend and the second portion being integrally coupled with the first wire via a second bend. In a third example, the first wire defines an axis; the third portion is parallel to but offset from the axis; and the first portion and second, portion are perpendicular to the axis. In a fourth example, the first wire is bent in at least four locations to form the key hole assembly. In a fifth example, the key hole assembly includes a substantially U-shaped cross-section.

In a sixth example of this embodiment, the pin defines a pivot axis about which the handle structure pivots relative to the door and frame, the pivot axis passing through the aperture when the door is disposed in its closed position. In a seventh example, the door is disposable in at least three positions, the at least three position including the open position, the closed and latched position, and the closed and unlatched position. In an eighth example, in the closed position, the plurality of interconnected wires of the door define a plane, and the tab assembly is oriented in a first direction perpendicular to the plane and the key hole assembly is oriented in a second direction perpendicular to the plane, the first direction and second direction being opposite one another.

In a ninth example, the first wire is formed by a vertical wire of the frame; the tab assembly is formed by a horizontal wire of the door; and the tab assembly is disposable behind a horizontal wire of the frame in the closed position. In a tenth example, the tab assembly includes a first portion defining a first axis, a second portion, a third portion, and a body, the second portion being parallel to but offset from the first axis, and the third portion being disposed perpendicularly to the first and second portions. In another example, the first portion of the tab assembly forms a hooked end at a location opposite the tab body along the wire, the hooked end overlapping and being vertically movable with respect to the pivot wire. In a further example, the tab body includes a height, the height being less than a minimum distance between adjacent and parallel horizontal wires of the frame to enable the door to pivot between its open and closed positions.

In another embodiment of this disclosure, a door assembly for an animal enclosure includes a frame having a plurality of interconnected horizontal and vertical wires that defines an opening for an animal to pass therethrough and to enter or exit the interior of the enclosure; a door having a plurality of interconnected horizontal and vertical wires and being coupled to the frame, the door being pivotable about a pivot wire of the frame to move between an open position and a closed position; a latch assembly having a handle structure and a pin, where the handle structure is pivotable with respect to one of the door and the franc, and the pin is movable axially with respect to one of the door and the frame; a first wire of the plurality of wires of the frame forming a key hole assembly, the key hole assembly defining an aperture for receiving the pin when the door is in a latched position with respect to the frame; and a tab assembly formed by at least one wire of the door, the tab assembly being disposable behind one of the plurality of wires of the frame in the closed position.

In one example of this embodiment, the key hole assembly includes a portion of the first wire at a location between a first end and a second of the first wire. In a second example, the key hole assembly includes a first portion, a second portion, and a third portion, the first portion being integrally coupled with the first wire via a first bend and the second portion being integrally coupled with the first wire via a second bend. In a third example, the first wire defines an axis; the third portion is parallel to but offset from the axis; and the first portion and second portion are perpendicular to the axis. In another example, the first wire is bent in at least four locations to form the key hole assembly. In a further example, the key hole assembly includes a substantially U-shaped cross-section.

In a further embodiment of this disclosure, a method is provided for manipulating a door of a door assembly from a closed position to an open position. The method includes providing a frame having a plurality of interconnected horizontal and vertical wires that defines an opening for an animal to pass therethrough and to enter or exit the interior of the enclosure, a door coupled to the frame and having a plurality of interconnected horizontal and vertical wires, a latch assembly having a handle structure and a pin, a first wire of the plurality of wires of the frame forming a key hole assembly, and a tab assembly formed by at least one wire of the door; in the closed position, moving the handle structure and pin in a direction away from the key hole assembly; unlatching the door from a latched position by executing the moving step until an end of the pin clears and is no longer disposed within an aperture defined by the key hole assembly; pivoting the handle structure about a pivot axis defined by the pin; lifting the door so that a plurality of hooked ends of horizontal wires move vertically with respect to and along a pivot wire of the frame; positioning the tab assembly at a location with respect to the frame where a bottommost surface of the tab assembly is above a horizontal wire of the frame to which it contacts in the closed position; pivoting, the door about the pivot wire towards the open position; passing the tab assembly through a spaced defined between parallel and adjacent horizontal wires of the frame; and manipulating, the door to its open position.

In another embodiment of the present disclosure, an animal enclosure includes a plurality of members defining an interior of the enclosure, where the plurality of members includes at least a first member; a frame of the first member having a plurality of interconnected wires that define an opening for an animal to pass therethrough and to enter or exit the interior of the enclosure; a door of the first member having a plurality of interconnected wires and being coupled to the frame, the door being pivotable about a pivot wire of the frame to move between an open position and a closed position; a latch assembly having a handle structure and a pin, where the handle structure is pivotable with respect to one of the door and the frame, and the pin is movable axially with respect to one of the door and the frame; a first wire of the plurality of wires of the frame forming a key hole assembly, the key hole assembly defining an aperture for receiving the pin when the door is in a latched position with respect to the frame; and a tab assembly formed by at least one wire of the door, the tab assembly being disposable behind at least one of the plurality of wires of the frame in the closed position; wherein, the latch assembly is disposable in a latched position when the pin is disposed within the aperture, and an unlatched position when the pin is removed from the aperture; further wherein, the door is slidably and pivotably coupled to the pivot wire of the frame.

In one example, the key hole assembly includes a portion of the first wire at a location between a first end and a second of the first wire. In a second example, the key hole assembly includes a first portion, a second portion, and a third portion, the first portion being integrally coupled with the first wire via a first bend and the second portion being integrally coupled with the first wire via a second bend. In a third example, the first wire defines an axis; the third portion is parallel to but offset from the axis; and the first portion and second portion are perpendicular to the axis. In a fourth example, the first wire is bent in at least four locations to form the key hole assembly. In a fifth example, the key hole assembly comprises a substantially U-shaped cross-section.

In a sixth example, the pin defines a pivot axis about which the handle structure pivots relative to the door and frame, the pivot axis passing through the aperture when the door is disposed in its closed position. In a seventh example, the tab assembly includes a first horizontal wire of the door having a first portion, a second portion, a third portion, and a body portion, the body portion engaging the frame in the closed position. In an eighth example, the body portion includes a downward turned hook. In a ninth example, the plurality of interconnected wires of the door define a plane, the first portion being disposed within the plane and the second portion being offset from but parallel to the plane. In a tenth example, a first bend is formed between the first portion and the second portion; and a second bend is formed between the second portion and the third portion.

In an eleventh example, the third portion is disposed substantially perpendicular to the first and second portions. In a further example, the body portion is disposed behind a horizontal wire of the frame in the closed position. In yet a further example, the first portion of the tab assembly forms a hooked end at a location opposite the body portion along the first horizontal wire, the hooked end overlapping and being vertically movable with respect to the pivot wire. In another example, the body portion includes a height, the height being less than a minimum distance between adjacent and parallel horizontal wires of the frame to enable the door to pivot between its open and closed positions. In yet another example, the tab assembly comprises a first tab assembly and a second tab assembly, the first tab assembly formed by a first horizontal wire of the door and the second tab assembly formed by a second horizontal wire of the door, the first horizontal wire and second horizontal wire being adjacent to and vertically offset from one another; wherein, the latch assembly is coupled to the door at a location between the first tab assembly and the second tab assembly.

In yet a further embodiment of this disclosure, a door assembly includes a frame having a plurality of interconnected horizontal and vertical wires that defines an opening for an animal to pass therethrough and to enter or exit the interior of the enclosure; a door having a plurality of interconnected horizontal and vertical wires and being coupled to the frame, the door being pivotable about a pivot wire of the frame to move between an open position and a closed, position; a latch assembly having a handle structure and a pin, where the handle structure is pivotable with respect to one of the door and the frame, and the pin is movable axially with respect to one of the door and the frame; a first wire of the plurality of wires of die frame forming a key hole assembly, the key hole assembly defining an aperture for receiving the pin when the door is in a latched position with respect to the frame; and a tab assembly formed by at least one wire of the door, the tab assembly being disposable behind one of the plurality of wires of the frame in the closed position; wherein, the latch assembly is disposable in a latched position when the pin is disposed within the aperture, and an unlatched position when the pin is removed from the aperture; further wherein, the door is slidably and pivotably coupled to the pivot wire of the frame.

In a first example of this embodiment, the key hole assembly includes a portion of the first wire at a location between a first end and a second of the first wire. In a second example, the door is disposable in at, least three positions, the at least three position including the open position, the closed and latched position, and the closed and unlatched position. In a third example, the tab assembly includes a first portion defining a first axis, a second portion, a third portion, and a body, the second portion being parallel to but offset from the first axis, and the third portion being disposed perpendicularly to the first and second portions.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein;

FIG. 6 is a perspective view of the door frame and door assembly of FIG. 5 with a latch in an unlatched position.

FIG. 7 is a perspective view of the door assembly of FIG. 6 in an open position;

Corresponding reference numerals are used to indicate corresponding parts throughout the several views.

DETAILED DESCRIPTION

The embodiments of the present disclosure described herein are not intended to be exhaustive or to limit the disclosure to the precise forms disclosed in the following detailed description. Rather, the embodiments are chosen and described so that others skilled in the art appreciate and understand the principles and practices of the present disclosure.

The present disclosure relates to an animal enclosure. The animal enclosure can be used for multiple purposes, such as to contain one or more animals or objects. The enclosure can be made of any size for accommodating an animal or object of any size. In addition, the enclosure can be made of different materials including aluminum, plastic, and steel. The enclosure can be designed as, an animal cage to define an interior that is surrounded at all sides, or it can be designed as an exercise pen in which at least one side is not present, for instance a top side.

Figure 1:
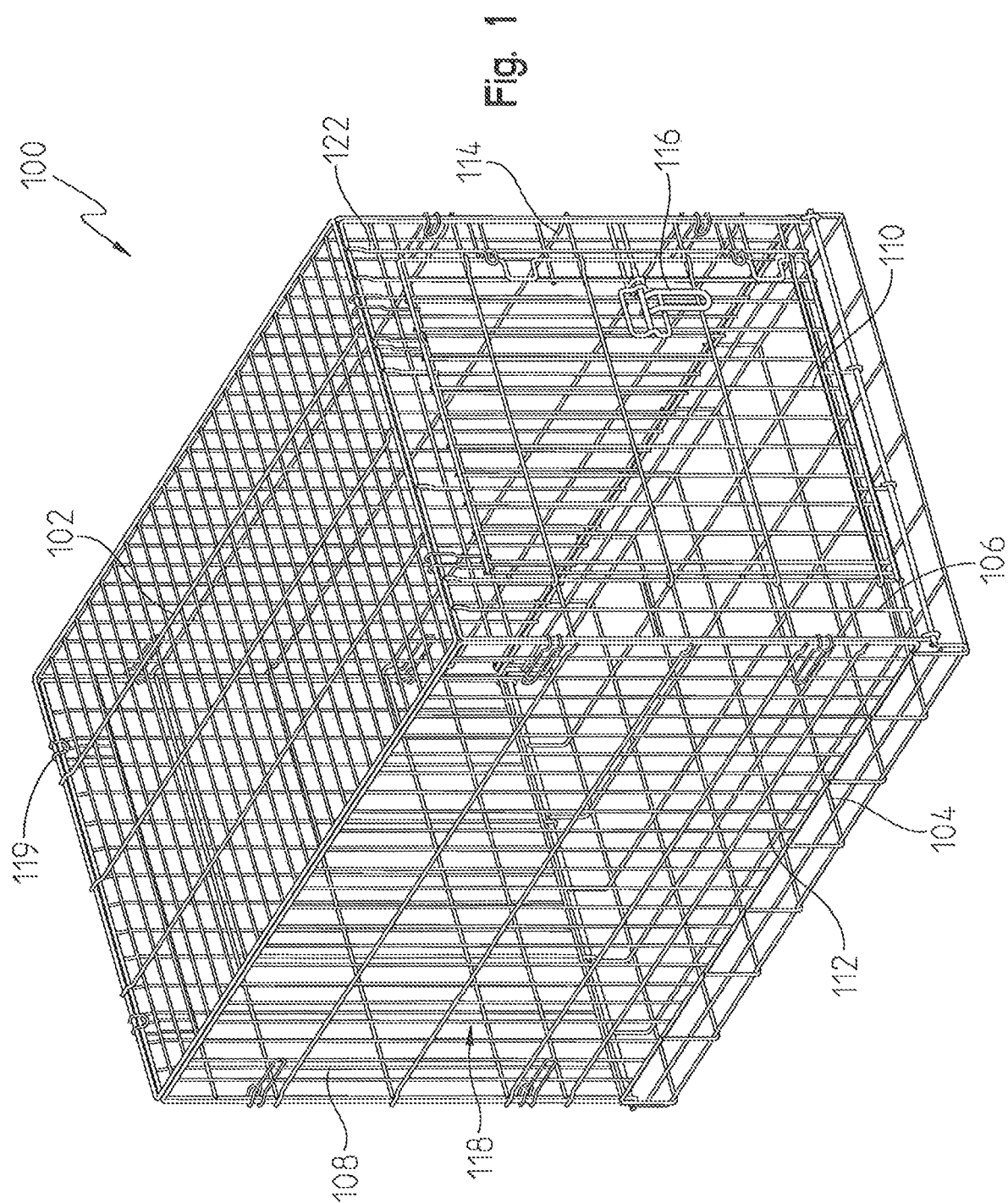
FIG. 1 is a perspective view of an animal enclosure.

Referring to FIG. 1, an exemplary embodiment of an animal enclosure 100 is shown. The enclosure 100 is in the form of an exercise pen, but this is only in to be exemplary. The enclosure 100 can be formed of substantially horizontal and vertical wires that overlap one another to define an interior portion 118. One or more of the horizontal wires can be coupled to one or more of the vertical wires, and vice versa, to add structural integrity to the enclosure 100. In other embodiments, wires are oriented in other directions than horizontal and vertical. The wires may be welded, adhered, fastened, or coupled to one another through a variety of means. The enclosure 100 can include a plurality of sides or members that form the enclosure 100.

In FIG. 1, for example, the enclosure 100 includes a top member 102, a bottom member 104, a front member 106, and a rear member 108. The front member 106 includes a door assembly 110 which opens and closes to provide access to the interior of the enclosure 100. The enclosure 100 also includes a first side 112 and a second 114. A latch 116 is operatively connected to the door assembly 110 and is configured to maintain the door assembly 110 in the closed position when latched. Each individual member, in different embodiments, is coupled to an adjacent member via one or more of a fastener, clip, latch, or other means. For instance, in FIG. 1, each member is coupled to an adjacent member by use of one or more clips 119. Vertical or horizontal wires of the respective member can be rotatably disposed within the clip to allow the enclosure, of any number of sides, to be configured in a desired manner. While the illustrated embodiment depicts eight sides, other embodiments may include any number of sides. In this manner, a user may assemble the enclosure to any desired shape based on the size of the animal, object etc. being contained therein.

With respect to the enclosure 100, the front member 106 is shown having the door 110. The door 110 is coupled to a frame 122 defined by the front member 106, such that the door 110 can be configured to move between the open position and the closed position. For instance, the door assembly 110 can be pivotally coupled to the frame 122 so that the door 110 can pivot from one position to the other position and in between. Moreover, other members can include a door, Although only one door 110 is shown in FIG. 1, in other embodiments two or more door assemblies for accessing the interior of the enclosure 100 are included.

Figure 2:
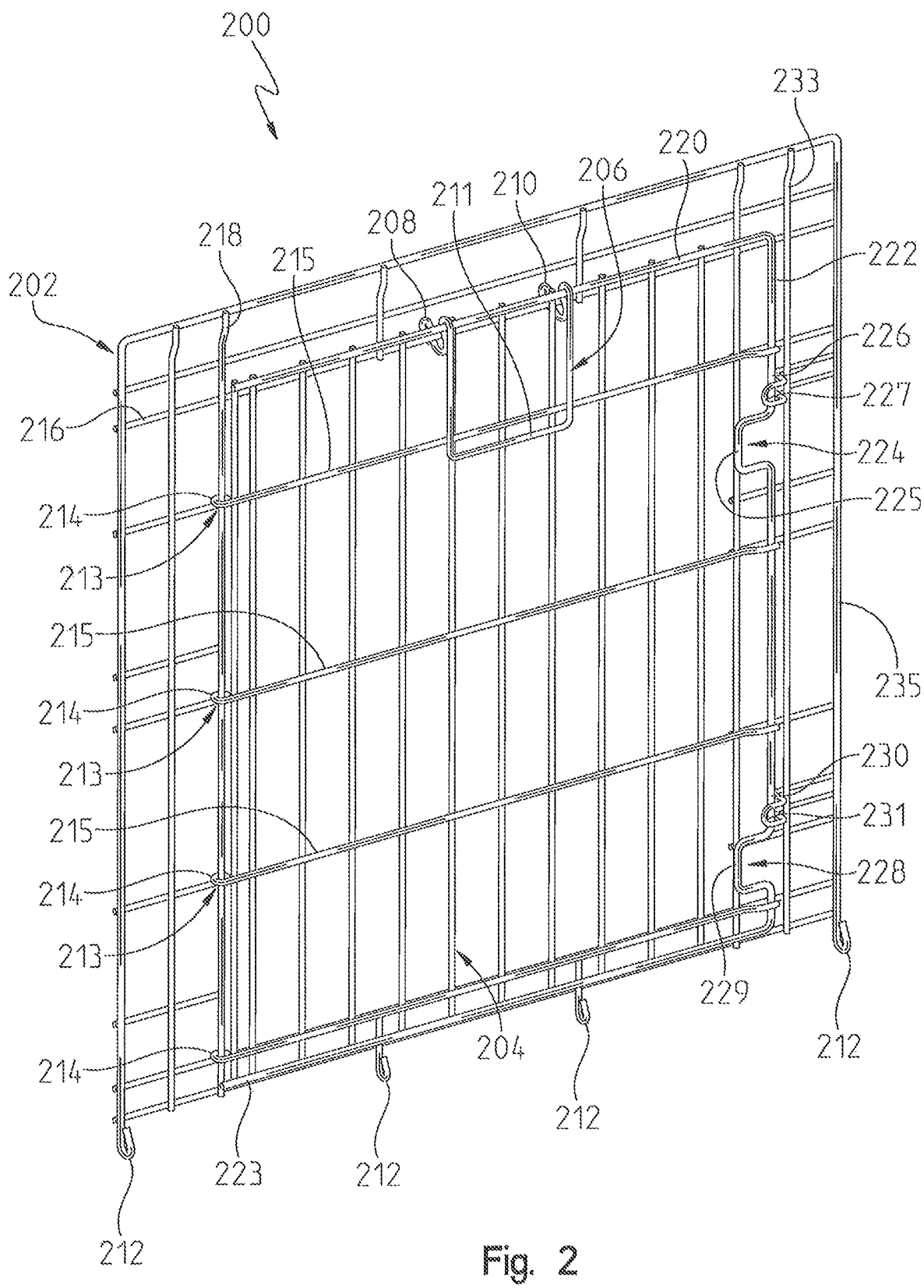
FIG. 2 is a perspective view of a door frame and door assembly of the animal enclosure of FIG. 1 with a latch in a latched position.

Referring to FIG. 2, the first member 106 and its door 110 are shown in greater detail as door assembly 200. The door assembly 200 includes a frame 202 which supports a pivotable door 204. The frame 202 defines an opening which is spanned by the door 204, where the opening provides for entry to and exit from the interior of the enclosure 100. In this embodiment, the door 204 is movable between the closed position (e.g., FIG. 2) and the open position (e.g., FIG. 4), Moreover, the door 204 is moveable between the open position and closed position relative the frame 202.

The door assembly 200 includes a handle or latch assembly 206 operatively connected to the door 204 for releasably engaging with the frame 202. The latch assembly 206 includes a first curved end 208 and a second curved end 210 configured to engage a horizontal wire 216 of the frame 202. In other embodiments, latch assembly 206 includes a single curved end. A handle portion 211 of the latch assembly 206 provides a gripping surface for opening and closing the latch. The horizontal wire 216 is fixedly coupled to a vertical wire 218, one of the vertical wires provided by the frame 202. The door assembly 200 includes a plurality of horizontal wires 215, some of which terminate in a hook 213 having a curved end 214, which is configured to wrap around the vertical wire 218 to enable pivoting movement of the door 204 about the wire 218 and to enable sliding movement of the door 204 along the wire 218. Movement of the>latch 206 about a top horizontal wire 220 of the door 204 engages or disengages the latch 206 from the horizontal wire 216. When engaged, the latch 206 restricts the door 204 from opening. When disengaged, the latch 206 is positioned to allow the door 204 to be pivoted to the open position. A plurality of hooks 212 extend from the vertical wires of the frame 202 which position the frame 202 with respect to the bottom member 104 of the enclosure 100 (see FIG. 1).

The door 204 further includes a vertical wire 222 and a bottom horizontal wire 223. In the illustrated embodiment, the wire 220, wire 222, and wire 223 are a single piece of wire which is bent to shape and defines part of the outer perimeter of the door 204. In other embodiments, the wires 220, 222, and 223 are formed of two or more pieces of wire.

The frame 202 and door 204 are formed to provide a door stop 224 which is configured to substantially prevent the door 204 from being pivoted about the vertical wire 218, even in the event that the latch 206 is disengaged from the horizontal wire 216. The door stop 224 includes an access portion 225, which in the embodiment of FIG. 2 is a slot defined by the vertical wire 222, and a blocking portion 226, defined by a length of the vertical wire 222. The door stop 224 further includes a tab 227 coupled to the frame 202 at a vertical wire 233 and a vertical wire 235. A second door stop 228 includes an access portion 229 and a blocking portion 230 defined by the vertical wire 222. A tab 231, coupled to the frame 202, is provided as part of the door stop 228 in the embodiment of FIG. 2. Both of the access portions 225 and 229 are generally configured, as a "U" shape when viewed along the plane of the door 204.

Figure 3:
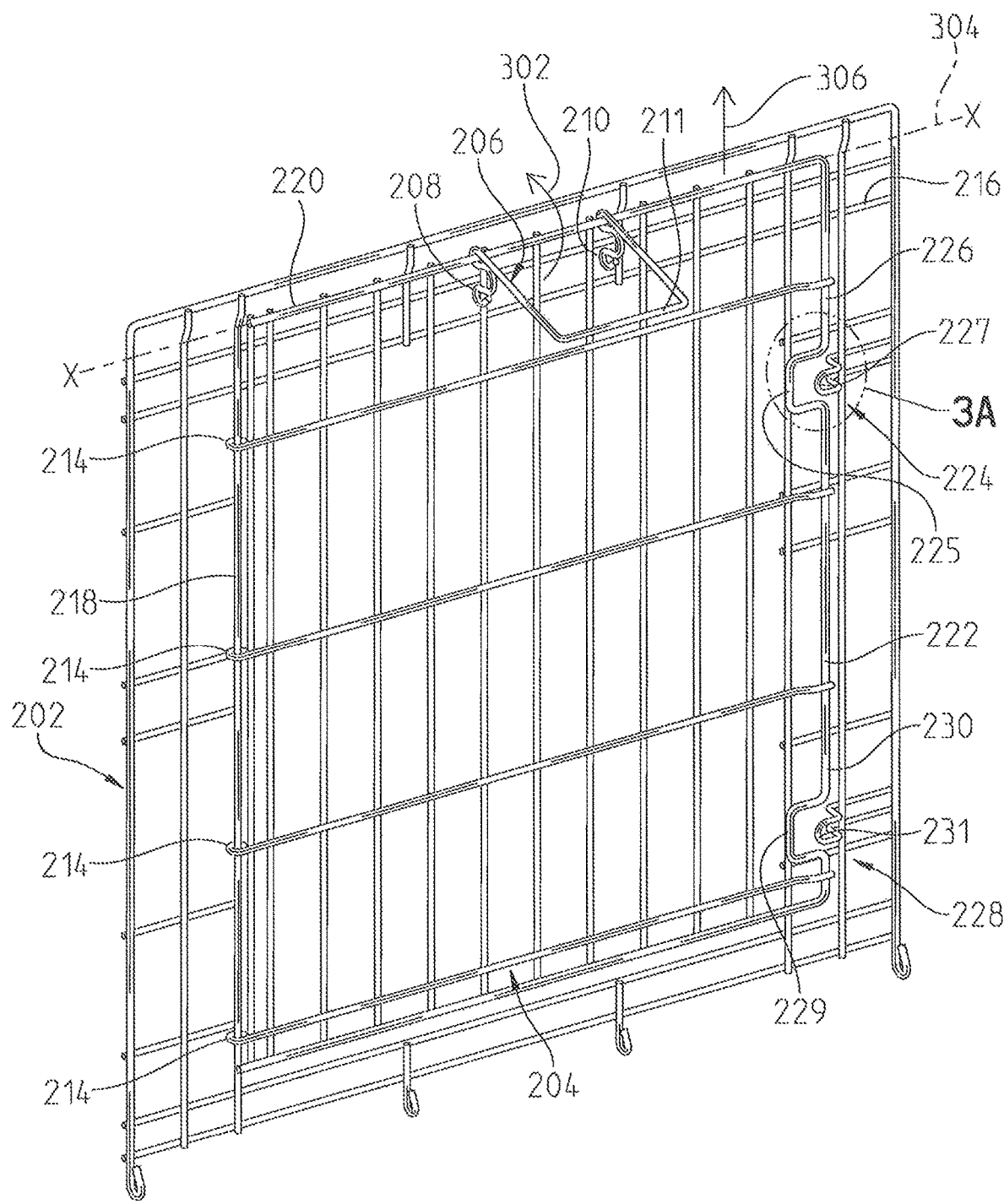
FIG. 3 is a perspective view of the door frame and door assembly of FIG. 2 with a latch in an unlatched position.

As shown in FIG. 3, the latch assembly 206 can be disengaged or unlatched from the horizontal wire 216 by moving the handle portion 211 along direction 302. In doing so, the latch assembly 206 is pivotally uncoupled from the horizontal wire 216 disposed on the frame 202. As the handle portion 211 is moved away from the door 204, the first and second curved ends 208 and 210 pivot about an X-axis 304 defined by the horizontal wire 220. Once the latch 206 is disengaged from the frame 202, the door 204 is free to move along the plane defined frame 202 in the direction 306. Since each of the wrapped ends 214 are located between adjacent horizontal wires of the frame 202, the door 204 is configured to slidingly move along the direction 306, as well as in the opposite direction, but is restricted in movement when one, or more, of the wrapped ends 214 comes into contact with one of the horizontal wires of the frame 202.

By moving the door 204 in the direction 306 a predetermined distance, the access portion of each of the door stops 224 and 228 is aligned with the tabs 227 and 231, which permits movement of the door 204 with respect to the frame 202 about the vertical wire 218. As can be seen in FIG. 3, the access portion 225 is horizontally aligned with the tab 227 and the access portion 229 is horizontally aligned with the tab 231. As can be seen in FIG. 2, the door 204 is in a first position with respect to the frame 202, such that the blocking portions 226 and 230 are horizontally aligned with the respective tabs 229 and 231. In this position, attempted movement of the door 204 about the vertical wire 218 is blocked or prevented from opening since any pivotal movement of the door is restricted when the blocking portions come into contact with the tabs.

As can be seen, in FIG. 2, the weight of the door 204 provides a self-locating function which places the door 204 in a position which substantially prevents opening of the door 204, should the latch 206 be located in an unlatched position. In this way, the arrangement of the access portions, the blocking portions and the tabs provide a degree of safety for the owner and the animal occupant of the enclosure. To open the cage, not only must the latch be unlatched, but the door 204 must be moved in the direction 306 to position the access portion relative to the tabs as illustrated in FIG. 3.

Figure 3A:
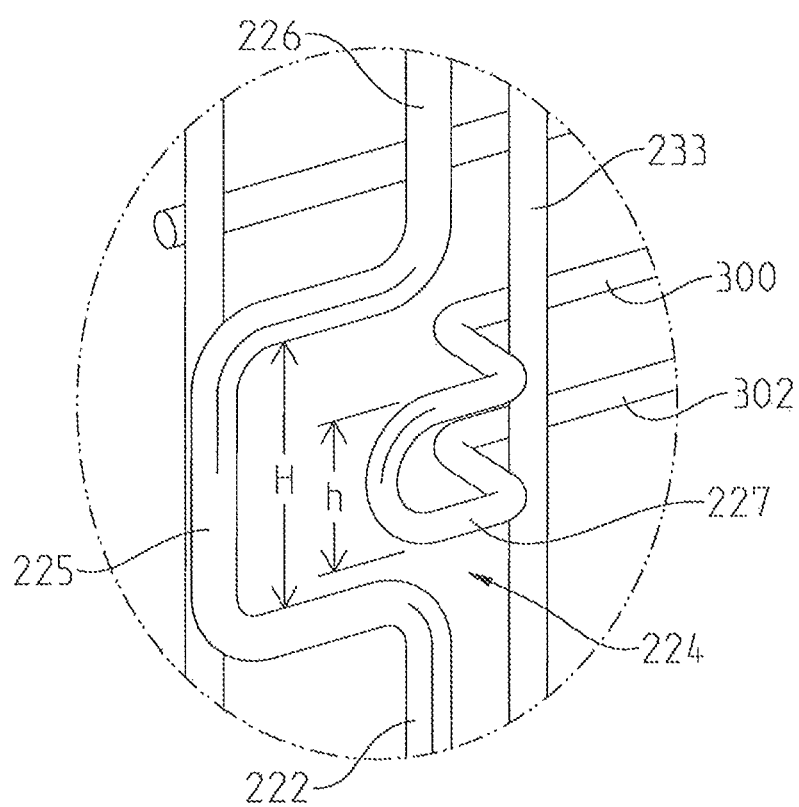
FIG. 3A is a perspective view of a door stop or catch of FIG. 3.

FIG. 3A illustrates the door stop 224 which includes the access portion 225, the blocking portion 226, and the tab 227. In one embodiment, the tab 227 is formed of a single piece of wire which is connected to the vertical wire 233 and the vertical wire 235. The tab 227 includes a first leg 300 and a second leg 302 which terminate at the tab 227 which includes multiple bends configured to place the tab 227 at a plane which is displaced from the plane of the frame 202. By spacing the tab 227 from the plane of the frame 202, the door 204 can be moved vertically with respect to the frame 202. The tab 227 defines a distance or a height "h" which is less than a distance of a height "H" defined by the access portion 225. In this configuration, therefore, the access portion 225 moves past the tab 227 when the door 204 is opened. With the door in this position, the blocking portion 226 is vertically displaced from the tab 227 and does not therefore prevent the door 204 from being opened. The door stop 228 is similarly configured as this configuration of FIG. 3A.

Figure 4:
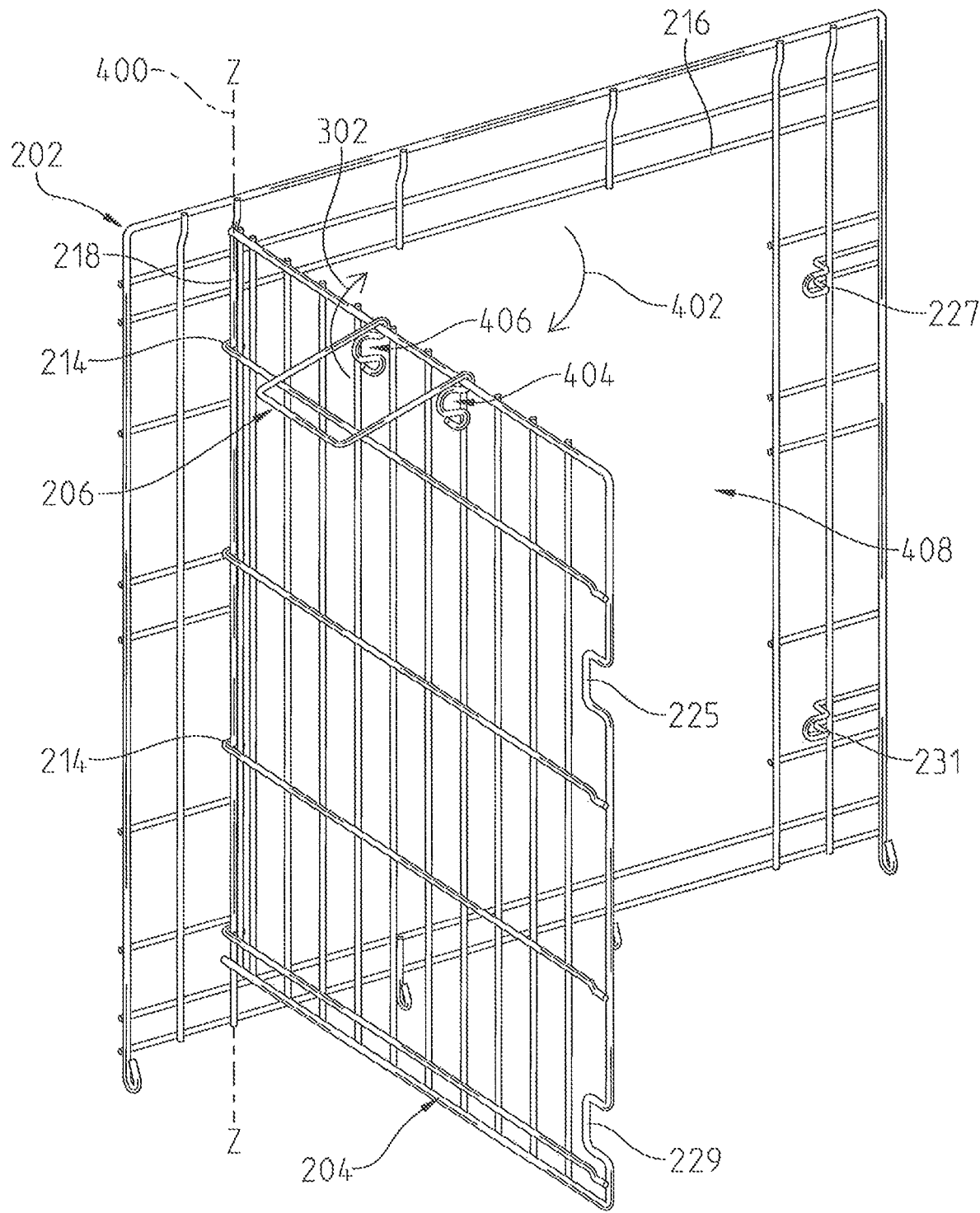
FIG. 4 is a perspective view of the door frame and door assembly of FIG. 2 with the door in an open position.

FIG. 4 illustrates the door 204 in the open position which is enabled by movement of the door 204 in the direction 306 as described with respect to FIG. 3. By moving the door 204 in the direction 306, the tabs 227 and 231 do not prevent the door 204 from pivoting about the vertical wire 218 which defines a vertical pivot Z axis 400. Movement of the door 204 in a direction 402 is facilitated by movement of the latch 206 in the direction 302 which disengages a first receptacle 404 and a second receptacle 406 from the horizontal wire 216. Opening of the door 204 provides an entrance/exit opening 408 for the animal.

Figure 5:
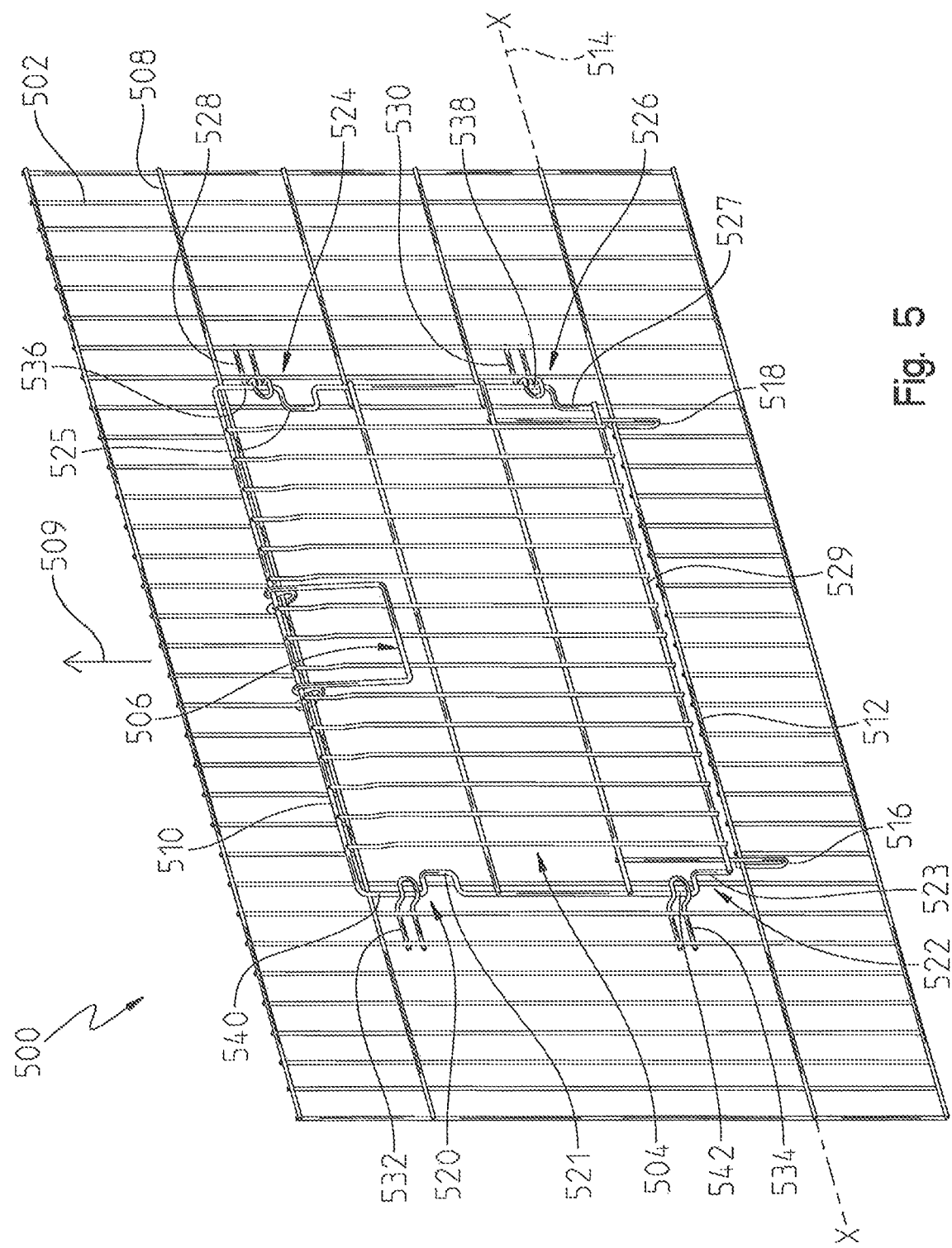
FIG. 5 is a perspective view of another embodiment of a door frame and door assembly.

FIG. 5 illustrates another embodiment of a door assembly 500 which includes a frame 502 and a door 504. A latch 506 is operatively connected to the door 504 which engages a horizontal wire 508 of the frame 502 to latch the door 504 in a closed position. The latch 506 pivots about a horizontal wire 510 to which it is operatively connected.

To open the door 504 in this embodiment, the latch 506 is moved outwardly from the plane of the door 504 and upwardly to disengage the latch 506 from the horizontal wire 508. At some point, continued upward movement of the latch 506 places the latch 506 in a position where the latch can be pulled upwardly generally in a direction 509. Continued movement of the latch 506 in, the direction 509 moves the door 504 in the same direction to enable pivotal movement of the door about a horizontal wire 512 of the frame 502 which defines an X pivot axis 514. The door 504 includes a first hook 516 and a second hook 518, each of which defines a slot through which the horizontal wire 512 extends. Internal ends of each of the slots determine the extent of the upward movement of the door 504 and provide a pivot point about which the door 504 pivots. In this embodiment, therefore, the hooks 516 and 518 define a larger space than the hooks 213 of FIG. 2, which enables the door 504 to move along the frame 502 to align features of a plurality of door stops.

The door assembly 500 includes a plurality of door stops: a first door stop 520, a second door stop 522, a third door stop 524 and fourth door stop 526, Each of the door stops includes an access portion, a blocking portion, and a tab as previously described. In the embodiment of FIG. 5, the door 504 includes access portions 521, 523, 525, and 527. The access portions 521 and 525 include a "U" shape as previously described for the access portions 225 and 229 of FIG. 2. In this embodiment, the access portions 523 and 527 are generally formed as an "L" shaped portion in which the vertically and horizontally extending legs of the "L" define an open portion, where the vertically extending leg is coupled to a horizontal wire 529. The horizontal wire 529 defines the bottom extent of the door 504. In other embodiments, the access portions 523 and 527 are "U" shaped.

Tabs 528, 530, 532, 534 are located on the frame 502. Each of the tabs is configured to block opening of the door, i.e., pivoting of the door about the X axis 514, if the door 504 is located in the location as illustrated in FIG. 5. The weight of the door tends to locate the door in the position illustrated such that the tabs 528, 530, 532, and 534 are disposed adjacently to blocking portions 536, 538, 540 and 542. Even if the latch 506 is moved to the unlatched position, the location of the blocking portions with respect to the tabs prevents the door 504 from being opened sufficiently to provide access to the interior of an enclosure.

FIG. 6 illustrates the door assembly 500 of FIG. 5, where the door 504 has been moved in the direction 509 to align each of the access portions with a corresponding tab. Sliding movement of the door 504 with respect to the frame 502 enables alignment of the access portions with the tabs. Once the tabs are aligned with access portions, the door can be pivoted about the wire 512 to open the door 504. As can be seen, the door 504 is sufficiently raised to place the ends of the slots defined by the hooks 516 and 518 such that the door pivots at the slots. The ends of the slots, however, do not need to be in contact with the horizontal wire 512 to enable pivoting; movement of the door 504.

Figure 6A:
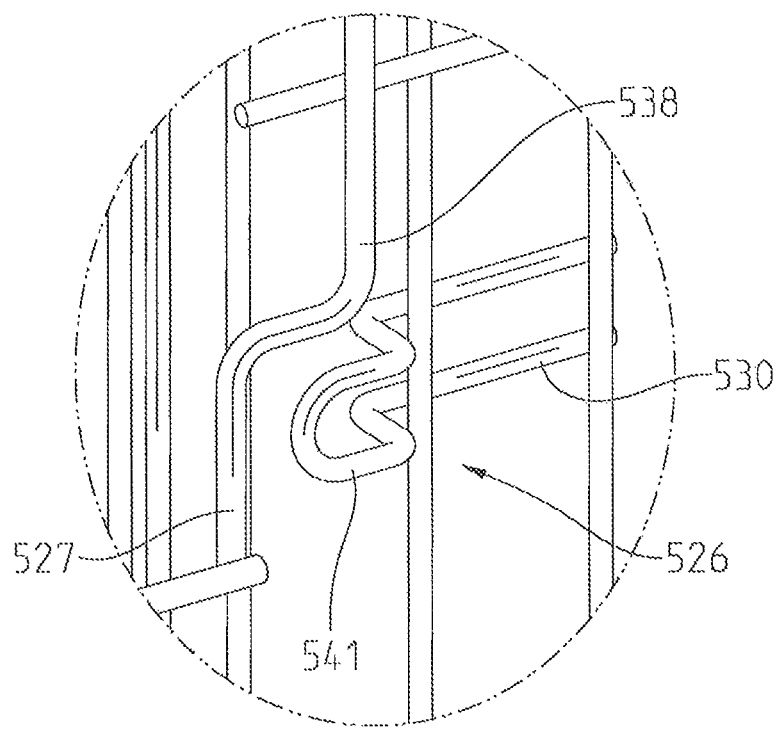
FIG. 6A is a perspective view of a door stop or catch of FIG. 6.

FIG. 6A illustrates a section of FIG. 6 which shows the door stop 526 including the tab 530, the access portion 527, and the blocking portion 538. The tab 530 is formed in a fashion similar to the previously described tabs and includes an extending portion 541, which is displaced from the plane of the frame 502 such that when the door 504 is in the lowered position, the blocking portion 538 prevents the door from opening due to interference with the tab 540. Movement of the door 504 upwardly positions the access portion 527 adjacent to the extending portion 540, but is sufficiently displaced from the extending portion to enable opening of the door 504.

FIG. 7 illustrates the door assembly 500 of FIG. 5 with the door 504 in an open position to allow movement of the animal through an opening 550 defined by the frame 502. In particular, each of the hooks 516 and 518 respectively includes a slot 552 and 554 defining a distance "d". The distance "d" is selected to provide sufficient upward movement of the door 504 with respect to the frame 502 to enable alignment of the access portions with the tabs. It is desirable to define the distance "d" such that upward movement of the door 504 with respect to the frame 502 is limited. In one embodiment, the distance "d" is selected such that contact with an end of one or both of the slots 552 and 554 provides sufficient clearance to open the door 504, without the need to manually align the access portion with the tabs. When the slots are appropriately sized, contact of the ends of the slot with the horizontal wire 512 when the door is named in the direction509 provides for accurate alignment of the access portions with the tabs without the need to make further adjustments.

Figure 8:
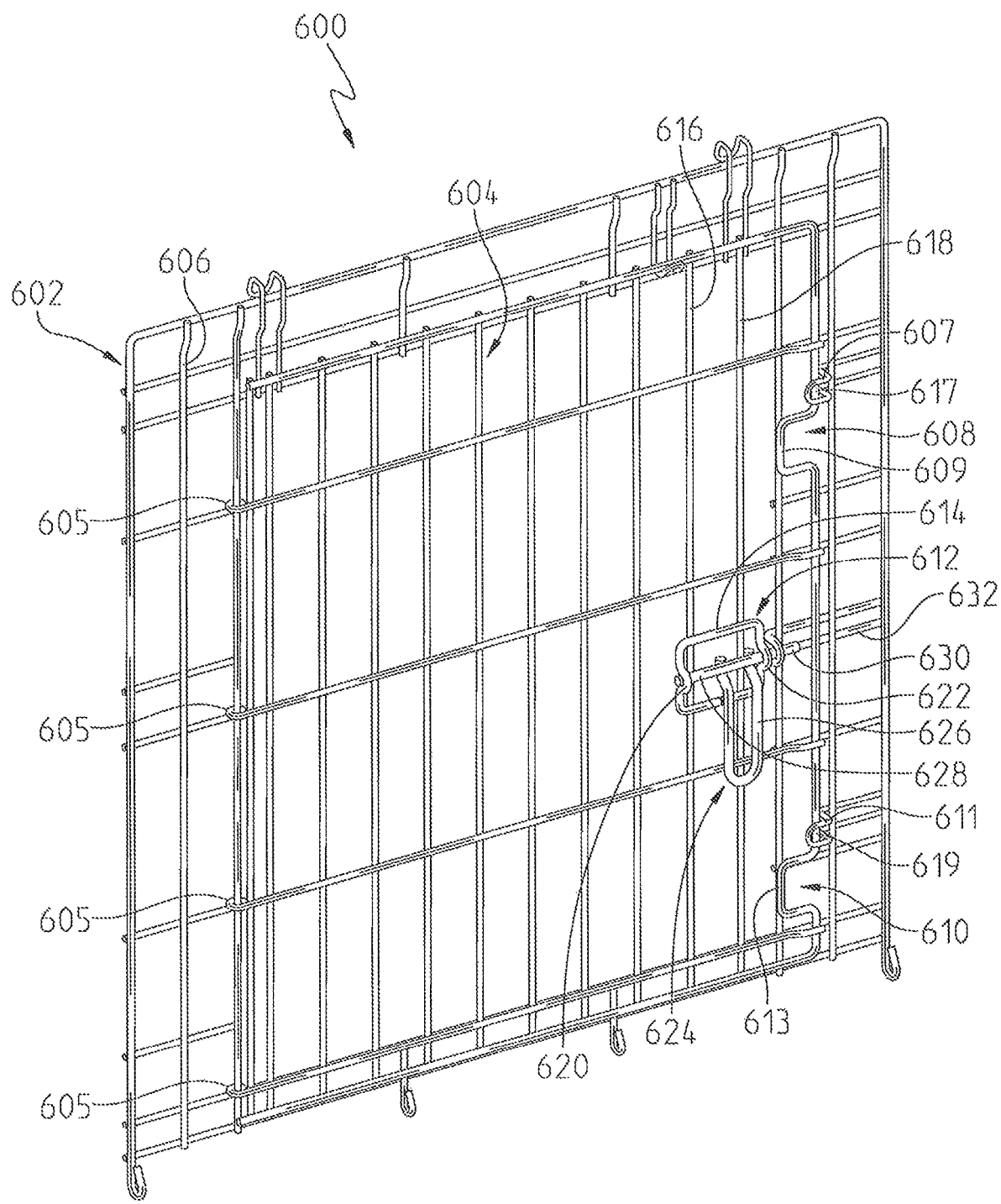
FIG. 8 is a perspective view of another embodiment of a door frame and door assembly.

FIG. 8 illustrates another embodiment of a door assembly 600 including a frame 602 and a door 604. In this embodiment, the door 604 includes a plurality of hooked ends 605 which surround a vertical wire 606 of the frame 602. The door 604 pivots about the vertical wire 606. The door assembly 600 includes a first door stop 608 and a second door stop 610. Each of the door stops 608 and 610 includes an access portion, a blocking portion, and a tab as previously described. Door stop 608 includes a tab 607, an access portion 609, and a blocking portion 617. Door stop 610 includes a tab 611, an access portion 613, and a blocking portion 619. In this embodiment, however, a latch assembly 612 is coupled to the door 604 at a side area of the door opposite the pivoting portion defined by the hooked ends 605.

The latch assembly 612 includes a support 614 which is fixed to a vertical wire 616 and a vertical wire 618 which also provide structure to the door 604. The support 614 is made of wire and includes a bent portion 620 and a bent portion 622 each defining a space between the support 614 and a plane defined by the horizontal and vertical wires forming the door 604. The spaces, are configured to accept a moveable latch 624 having a handle 626 fixedly coupled to a pin 628. Each of the spaces is sufficiently sized to enable sliding and rotational movement of the handle 626 with respect to the support 614. An end 630 of the pin 628 is configured to extend past the support to engage a tab 632 fixedly coupled to the frame 602. The tab 632 defines a tab aperture 633 (see FIG. 9) which is configured to accept the end 630 of the pin 628 in a latched position. Sliding movement of the pin 628 moves the end 630 into and out of the tab 632.

Figure 9:
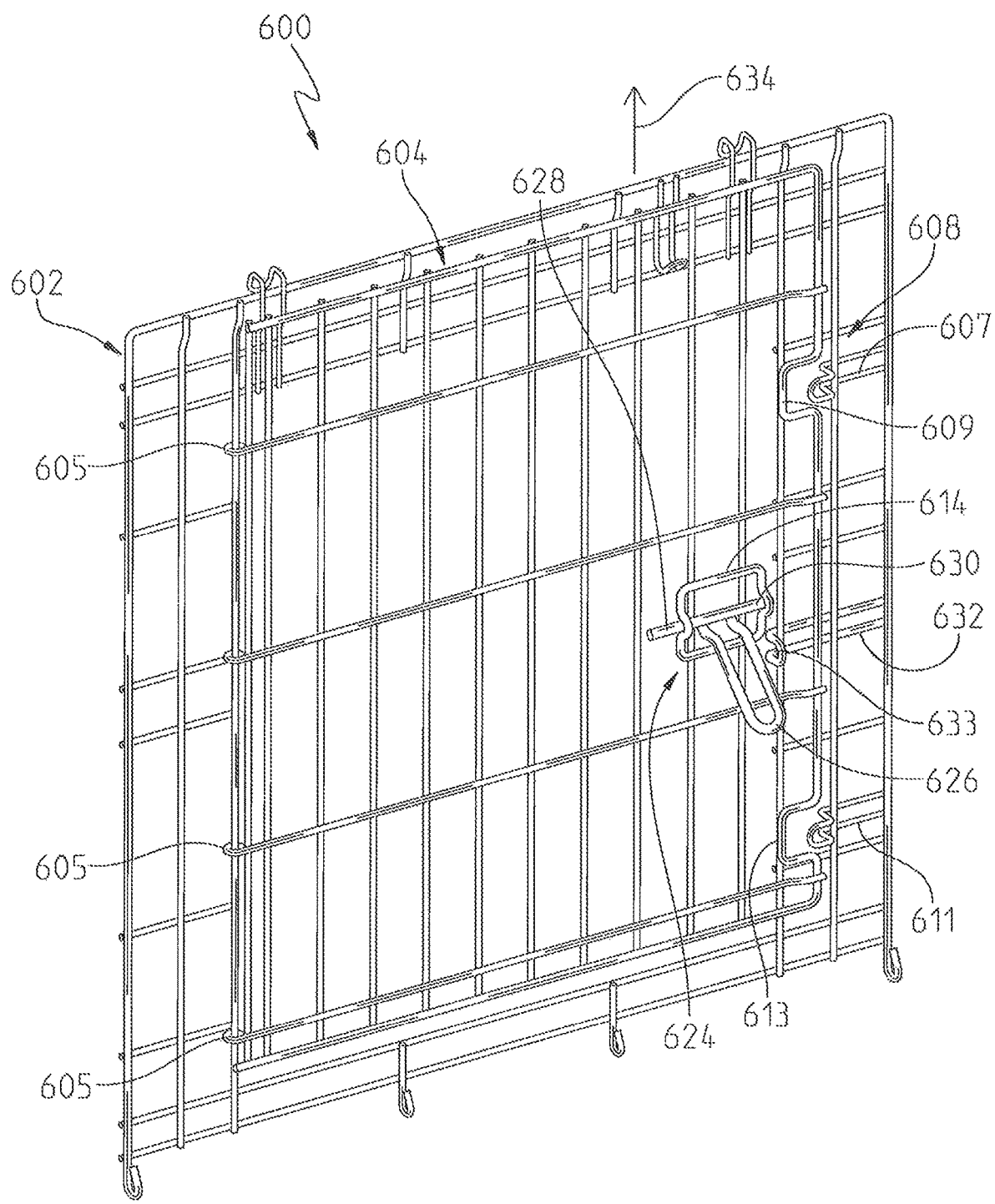
FIG. 9 is a perspective view of a latch of the door assembly of FIG. 8 in an unlatched position.

As further illustrated in FIG. 9, the latch 624 is located in a position in which the end 630 is moved out of the tab aperture 633. The door 604 has also been moved in a direction 634 to align tab 607 with the access portion 609 and tab 611 with access portion 613. Once the opening alignment of the door with respect to the frame has been achieved, the door 604 is moveable from the illustrated closed position to an open position shown in FIG. 10. The open position of the door 604 provides access to the interior the enclosure through an opening 636.

Figure 11:
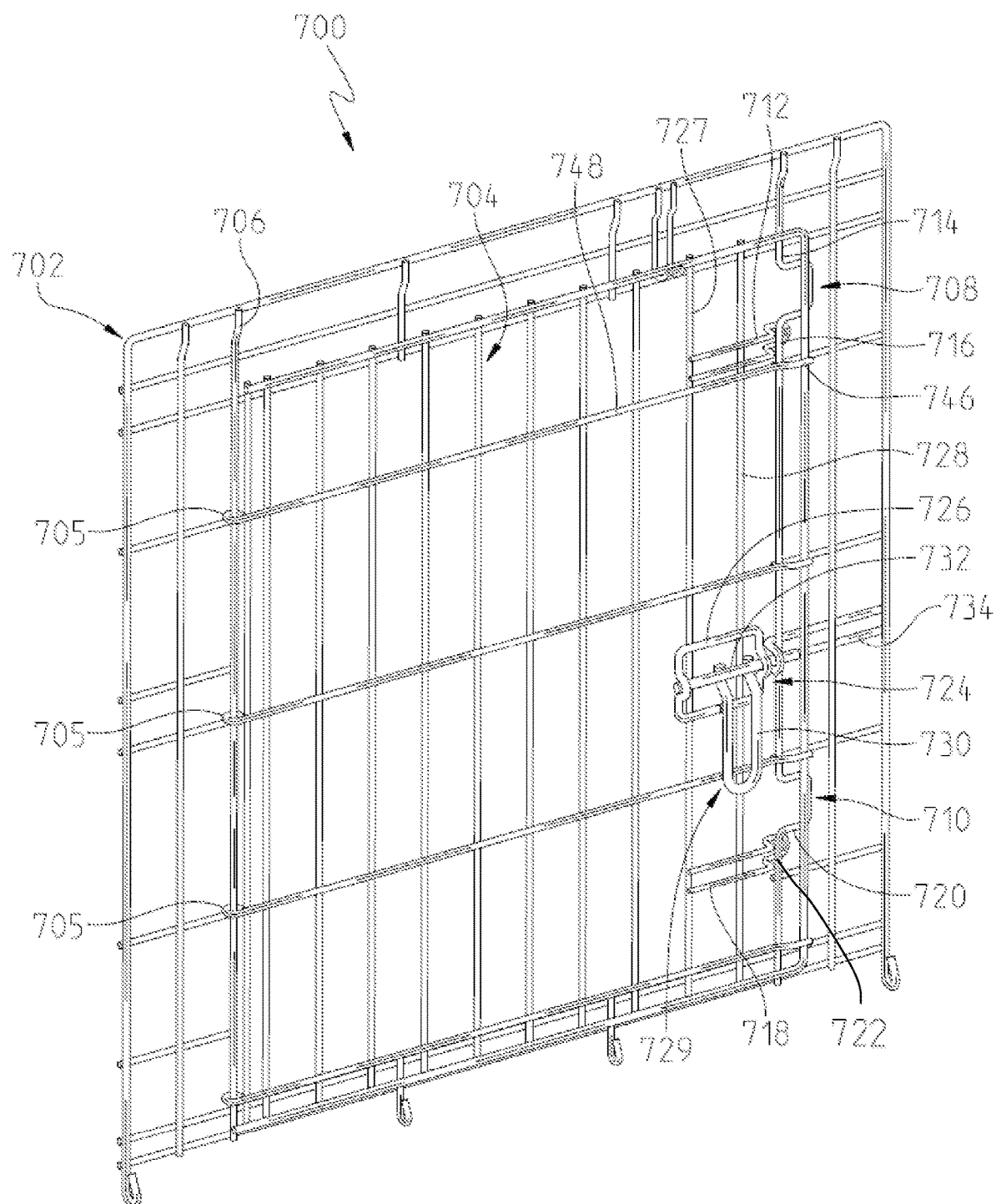
FIG. 11 is a perspective view of another embodiment of a door assembly.

FIG. 11 illustrates another embodiment of a door assembly 700 including a frame 702 and a door 704. In this embodiment, the door 704 includes a plurality of hooked ends 705 which surround a vertical wire 706 of the frame 702. The door 704 pivots about the vertical wore 706. The door assembly 700 includes a first door step 708 and a second door stop 710. Each of the door stops 708 and 710 includes an access portion, a blocking portion, and a tab as previously described. In this embodiment, however, each of the tabs are fixedly coupled to the door 704 and each of the access portions and blocking portions are configured as part of the frame 702. Door stop 708 includes a tab 712, an access portion 714, and a blocking portion 716. Door stop 710 includes a tab 718, an access portion 720, and a blocking portion 722. As before, the blocking portions 716 and 722 prevent opening of the door 704 when the door is in the lower position as illustrated in FIG. 11.

Figure 10:
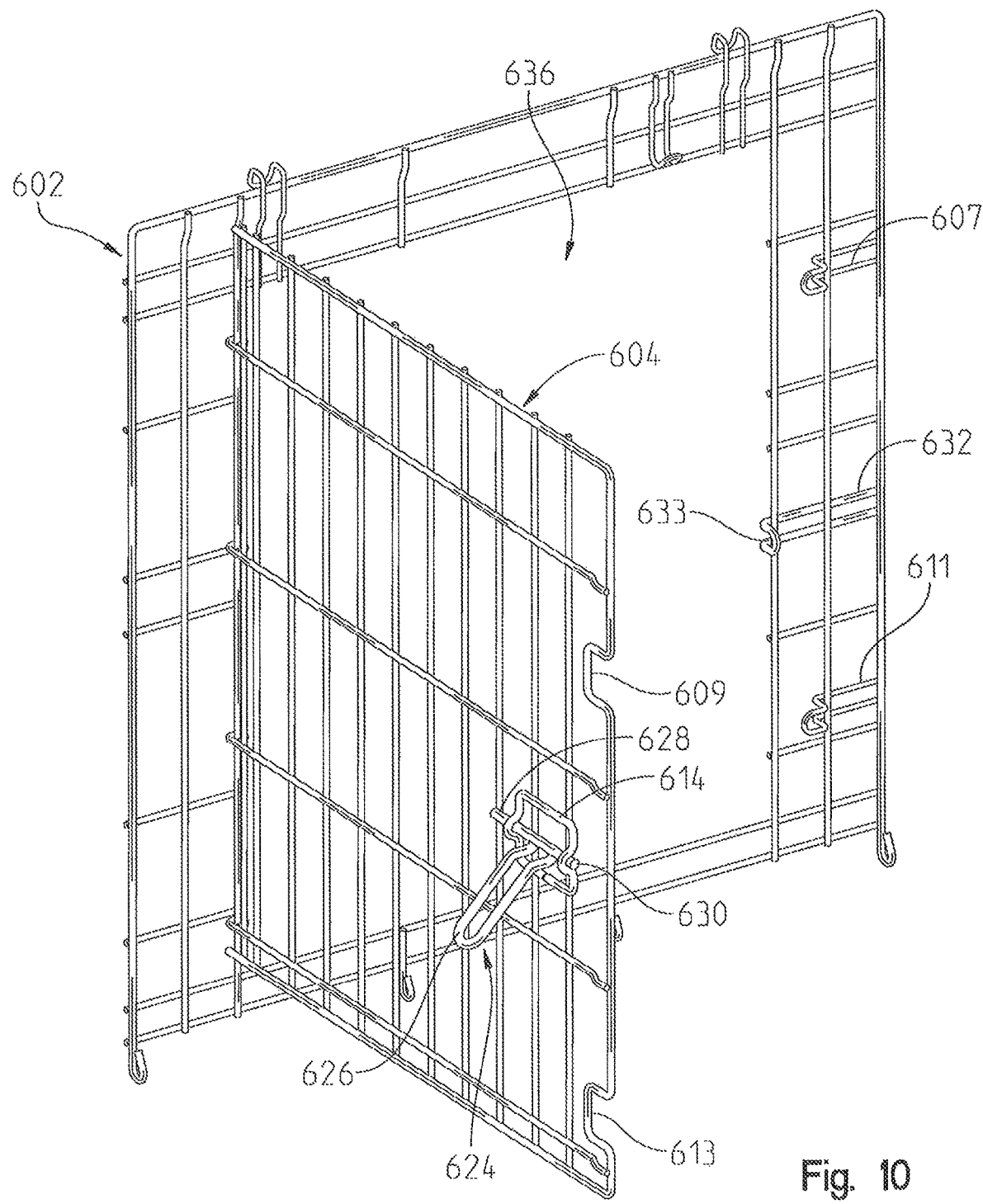
FIG. 10 is a perspective view of the door assembly of FIG. 8 in an open position.

The door 704 includes a latch assembly 724 which is substantially similar in form and function as the latch assembly 624 of FIGS. 8, 9, and 10. The latch assembly 724 includes a latch support 726 which is fixed to a vertical wire 727 and a vertical wire 728 which also provide structure to the door 704. The latch support 726 supports a moveable latch 729 having a handle 730 fixedly coupled to a pin 732. The pin slidingly engages a tab 734 as previously described.

Figure 12:
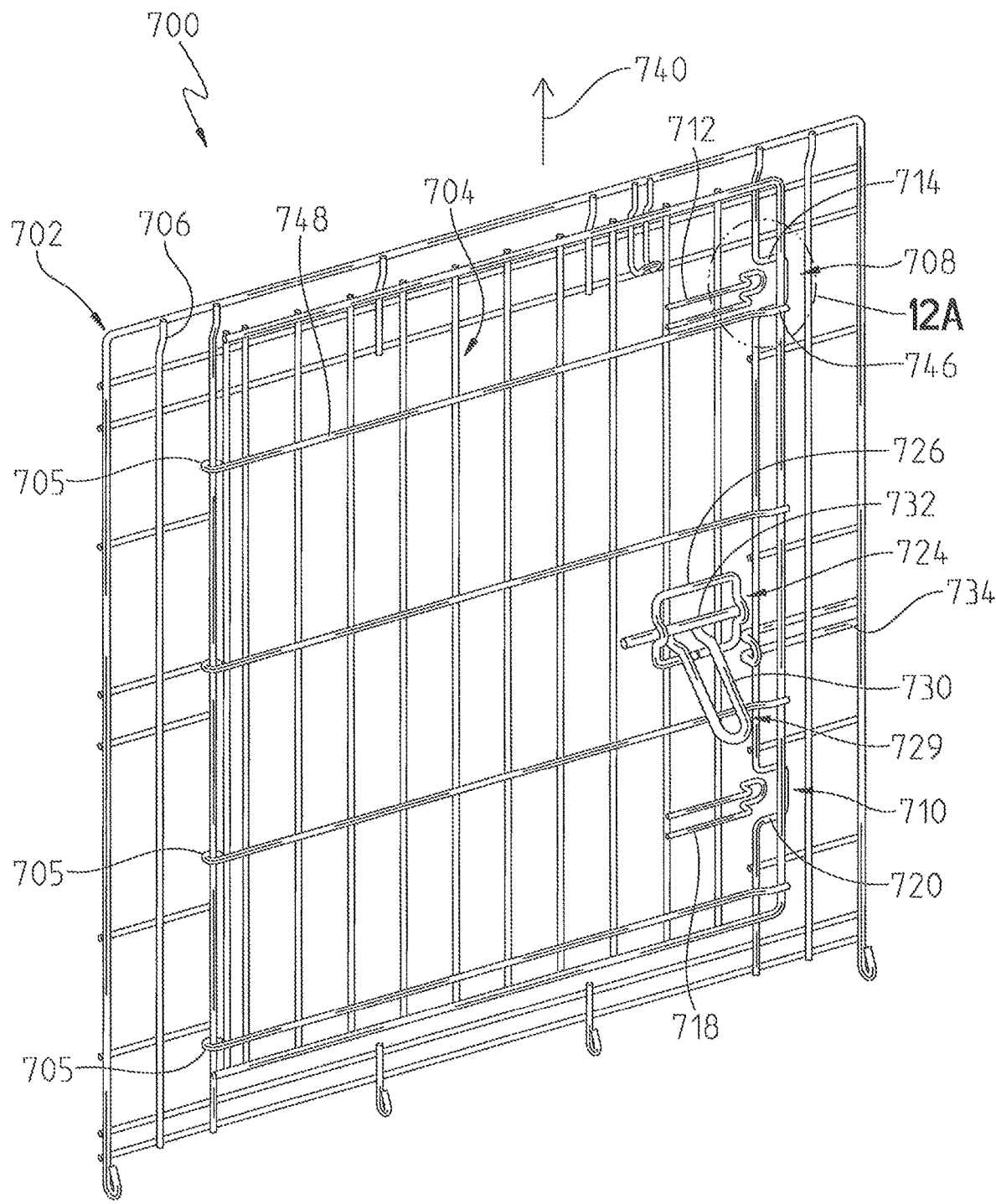
FIG. 12 is a perspective view of a latch of the door assembly of FIG. 11 in an unlatched position.

FIG. 12 illustrates the door 704 of FIG. 11 which has been moved in a direction 740 such the door 704 is moved upwardly with respect to the frame 702. In this position, each of the tabs 712 and 718 are horizontally positioned with respective access portions 714 and 720 to provide for opening of the door 704 when the latch 724 is unlatched. Upon disengagement of the pin 732 from the tab 734 and positioning of the door as illustrated, the door 704 can be opened to provide access to the interior of the enclosure through an opening 742 such as is illustrated in FIG. 13.

Figure 12A:
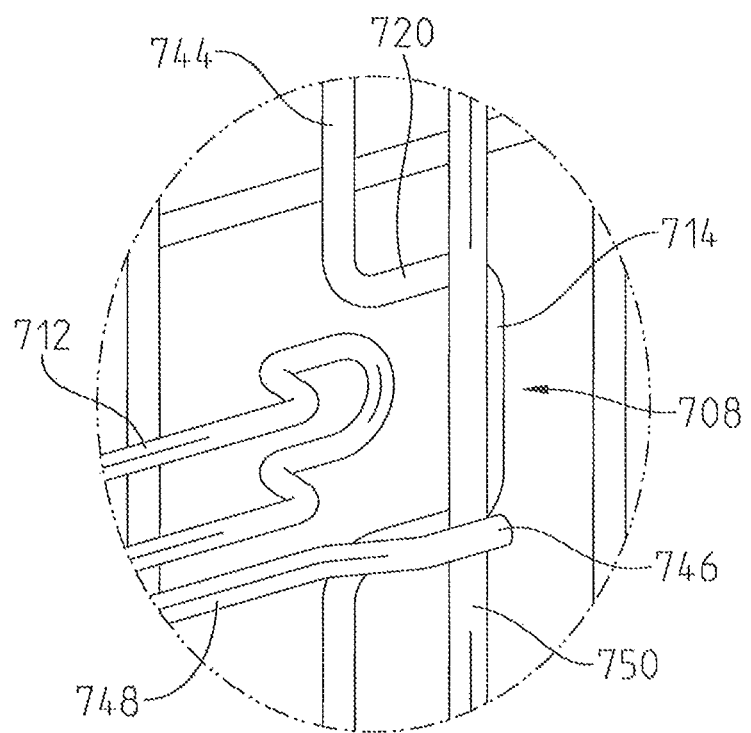
FIG. 12A is a perspective view of a door stop or catch of FIG. 12.
Figure 13:
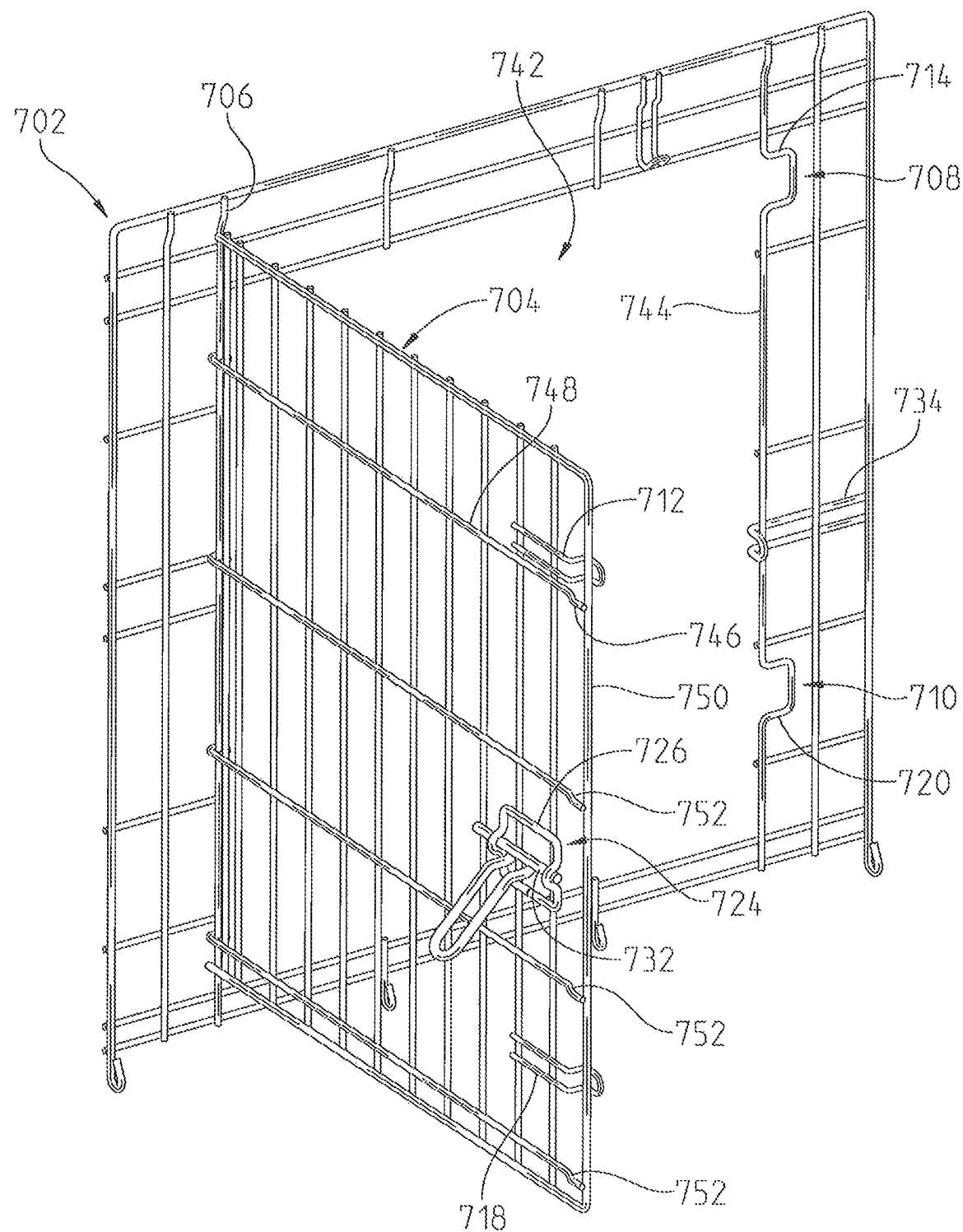
FIG. 13 is a perspective view of the door assembly of FIG. 11 in an open position.

As can be seen in FIG. 12A, which illustrates the stop 708, and in FIG. 13, the access portions 714 and 720 are thrilled as part of a vertical wire 744 which is one of the wires used to provide the frame 702. In this embodiment, the wire 744 is bent to define the access portion 714 and 720, each of which resembles a "U" shape. When latch 724 is moved to enable upward movement of the door and the tabs 712 and 718 are aligned with the access portions 714 and 720, the door 704 is moveable from the closed position to the open position. In this embodiment, the access portions 714 and 720 remain stationary during movement of the door 704 and the tabs 712 and 718 move with movement of the door 704, unlike previously described embodiments.

As also seen in FIG. 12A, the door includes a stop 746 which prevents the door 704 from swinging into the interior of the enclosure. In the illustrated the embodiment, the stop 746 is a portion of a horizontal wire 748. The stop 746 is spaced from a vertical wire 750 of the door 704 and defines a space between a front plane of the door 704 and the stop 746, The tab 712 defines a space between a back plane of the door 704. Consequently, in the closed position of FIG. 11, the tabs 712 and 718 are located in the interior of the enclosure and the stop 746 and a plurality of additional stops 752 are located outside of the enclosure. The tab 712, unlike previously described tabs, is fixed to the door 704, and moves as the door 704 moves. The access portions are fixed to the frame.

Figure 14:
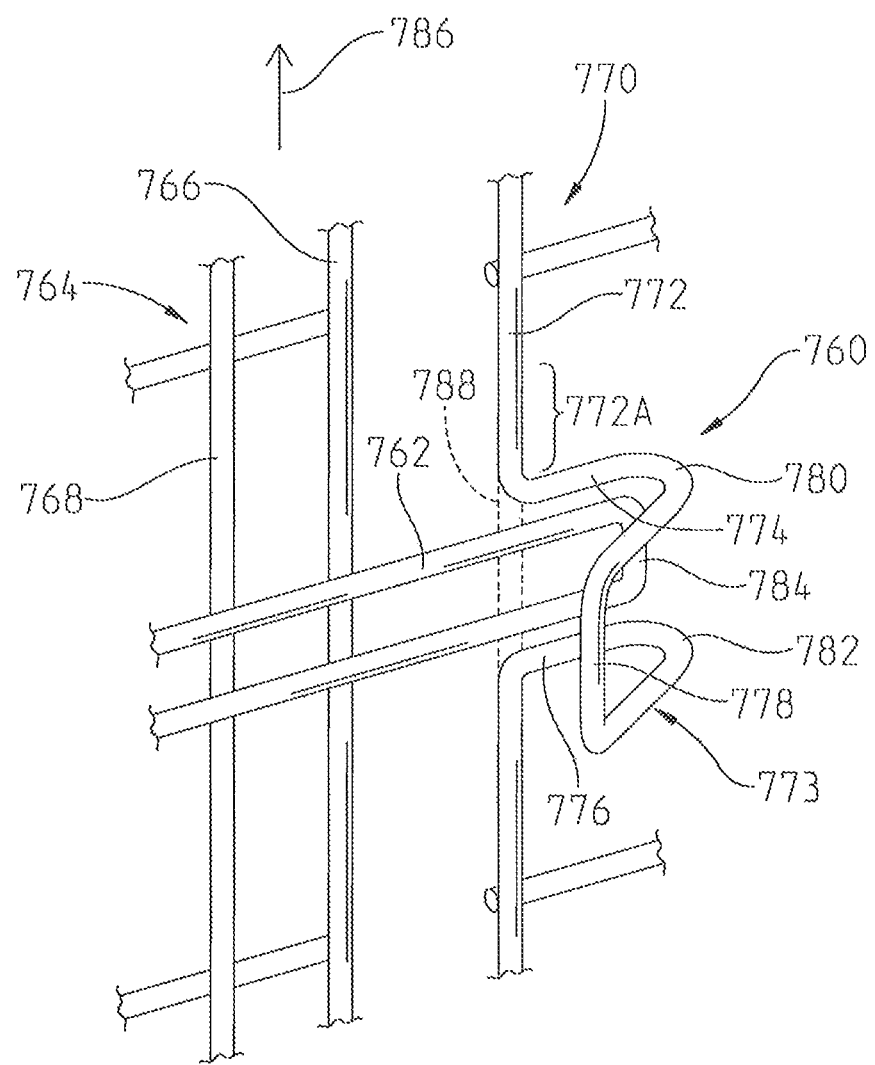
FIG. 14 is a perspective view of another embodiment of a door stop or catch.

FIG. 14 illustrates another embodiment of a door stop 760. In this configuration, an extension tab 762 is fixedly coupled to a door 764, only a portion of which is shown. The door 764 includes vertically and horizontally located wire, wherein the extension tab 762 is coupled to a vertical wire 766 and a vertical wire 768. A door frame 770, a portion of which is shown, includes a vertical wire 772 formed to include a blocking portion 773. In this embodiment, the blocking portion 773 prevents opening of the door 764 when the extension tab 762 is horizontally positioned between a first portion 774 and a second portion 776 of the blocking portion 773 which terminate at a blocking tab 778. The blocking tab 778 prevents or minimizes pivoting movement of door 764, when extension tab 762 is horizontally aligned with the blocking tab 778.

The blocking tab 778 is formed by a first bend 780 and a second bend 782 of the wire 772. At least one of the bends 780 and 782 includes an inside surface formed to be outside a terminating end 784 of the extension tab 762. Sufficient movement of the door 764 in a direction 786 moves the terminating end 784 outside of the blocking portion 773, such that sufficient pivotal movement of the door 764 is enabled to provide entry to and exit from the interior of the enclosure. In this embodiment, the access portion, which is a portion 772A of the vertical wire 772, does not prevent opening of the door, if the extension tab 762 is aligned with the portion 772A. The door 764, in another embodiment includes one or more extensions, such as extensions 746 and 752 of FIG. 13 to prevent the door from moving into the interior space. In another embodiment, the frame 770 includes a bar 788, shown in clotted outline in FIG. 14. Should the door 764 be pushed inward toward the interior of the enclosure, the extension 762 would come into contact with the bar 788, thereby preventing further inward movement. The bar 788 is either a part of the wire 772 or is a separate piece coupled to the wire.

Figure 15:
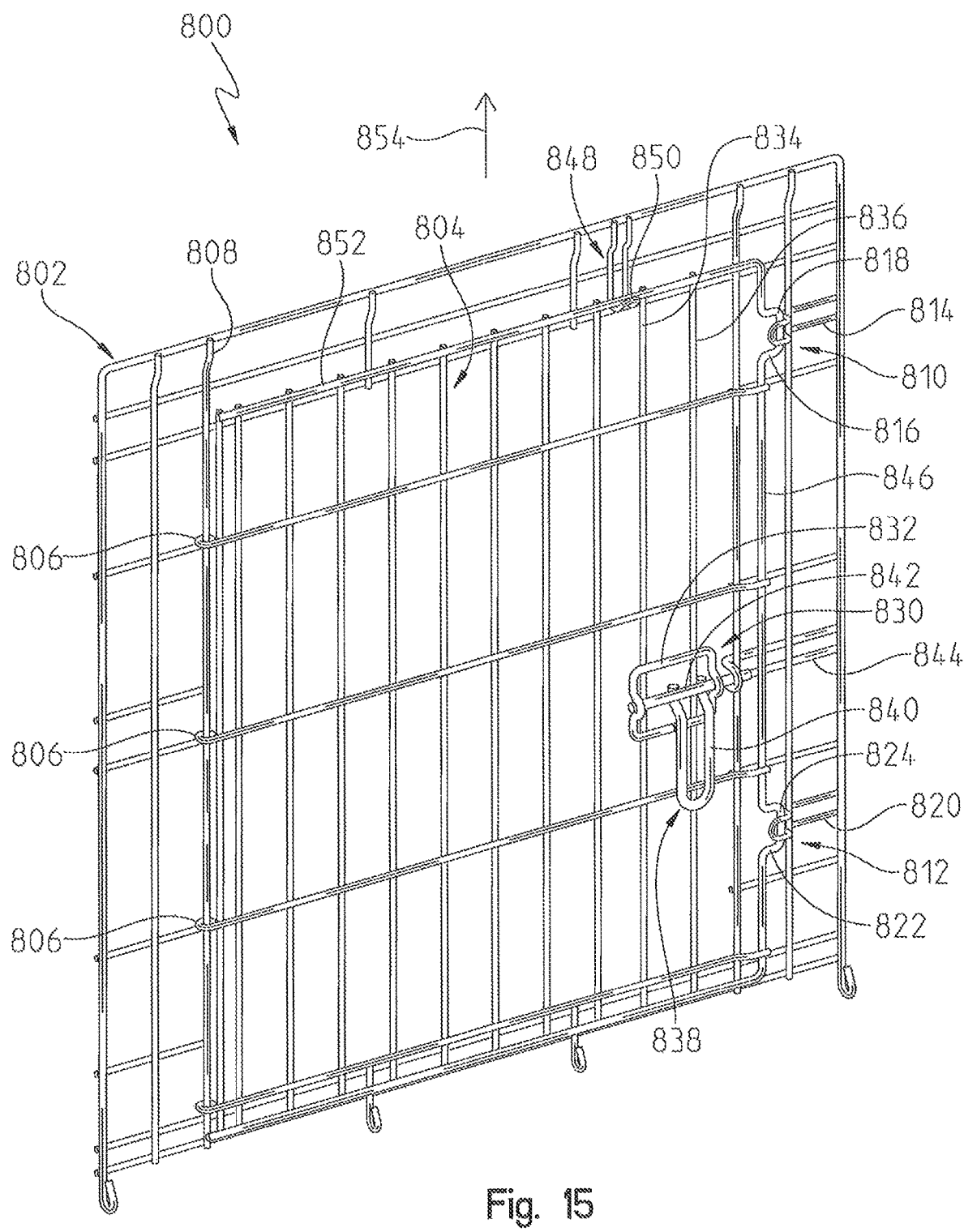
FIG. 15 is a perspective view of another embodiment of a door frame and door assembly.

FIG. 15 illustrates another embodiment of a door assembly 800 including a frame 802 and a door 804. In this embodiment, the door 804 includes a plurality of hooked ends 806 which surround a vertical wire 808 of the frame 802. The door 804 pivots about the vertical wire 808. The door assembly 800 includes a first door stop 810 and a second door stop 812. Each of the door stops 810 and 812 includes an access portion, a blocking portion, and a tab as described herein. In this embodiment, however, each of the tabs is fixedly coupled to the frame 802 and each of the access portions and blocking portions are configured as part of the door 804. Door stop 810 includes a tab 814, an access portion 816, and a blocking portion 818, Door stop 812 includes a tab 820, an access portion 822, and a blocking portion 824. The blocking portions 818 and 824 prevent opening of the door 804 when the door is in the lower position as illustrated in FIG. 15.

The door 804 includes a latch assembly 830 which is substantially similar in form and function as the latch assembly 624 of FIGS. 8, 9, and 10. The latch assembly 830 includes a latch support 832 which is fixed to a vertical wire 834 and a vertical wire 836, which also provide structure to the door 804. The latch support 832 supports a moveable latch 838 having a handle 840 fixedly coupled to a pin 842. The pin slidingly engages a tab 844.

The access portions 816 and 822 and the blocking portions 818 and 824 are defined by a vertical wire 846 of the door 804, which provides structure to the door 804. The frame 802 includes a retainer 848 coupled to the frame 802. A hook 850 of the retainer 848 engages a top wire 852 of the door 804 when the door 804 is in a closed position. By raising the door 804 in a vertical direction 854, the top wire 852 is disengaged from the hook 850 and the access portions 816 and 822 are respectively aligned with the tabs 814 and 820 such that the door 804 can be opened by pivoting the door 804 about the vertical wire 808.

In this embodiment, the tabs 814 and 820 each include terminating portions which extend away from a plane defined by the door 804 and to the exterior of the enclosure.

Figure 16:
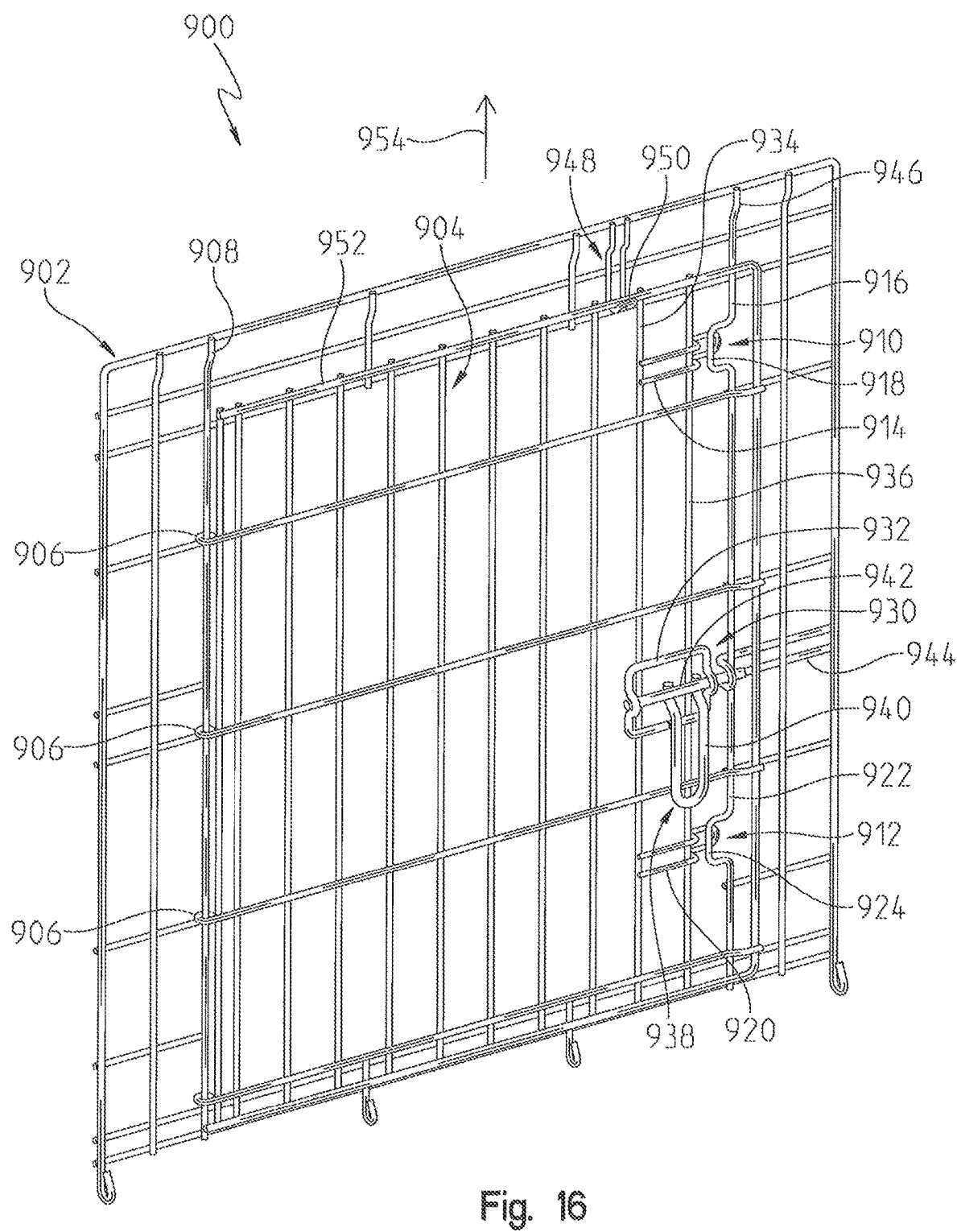
FIG. 16 is a perspective view of another embodiment of a door frame and door assembly.

FIG. 16 illustrates another embodiment of a door assembly 900 including a frame 902 and a door 904. In this embodiment, the door 904 includes a plurality of hooked ends 906 which surround a vertical wire 908 of the frame 902. The door 904 pivots about the vertical wire 908. The door assembly 900 includes a first door stop 910 and a second door stop 912. Each of the door stops 910 and 912 includes an access portion, a blocking portion, and a tab as described herein. In this embodiment, however, each of the tabs is fixedly coupled to the door 904 and each of the access portions and blocking portions are configured as part of the frame 902. Door stop 910 includes a tab 914, an access portion 916, and a blocking portion 918. Door stop 912 includes a tab 920, an access portion 922, and a blocking portion 924. The blocking portions 918 and 924 prevent opening of the door 904 when the door is in the lower position as illustrated in FIG. 16.

The door 904 includes a latch assembly 930 which is substantially similar in form and function as the latch assembly 624 of FIG. 8, 9, 10. The latch assembly 930 includes a latch support 932 which is fixed to a vertical wire 934 and a vertical wire 936 which also provide structure to the door 904. The latch support 932 supports a moveable latch 938 having a handle 940 fixedly coupled to a pin 942. The pin slidingly engages a tab 944 to latch the door in a closed position.

The access portions 916 and 922 and the blocking portions 918 and 924 are defined by a vertical wire 946, which provides structure to the frame 902. The frame 902 includes a retainer 948 coupled to the frame 902. A hook 950 of the retainer 948 engages a top wire 952 of the door 904 when the door 904 is in a closed position. By raising the door 904 in a vertical direction 954, the top wire 952 is disengaged or separated from the hook 950 and the access portions 916 and 922 are respectively aligned with the tabs 914 and 920 such that the door 904 can be opened by pivoting the door 904 about the vertical wire 908.

As can be seen in the embodiment of FIG. 16, each of the tabs 914 and 920 is located behind the wire 946, in the interior of the enclosure. The wire 946 forms the access portions and the blocking portions. Consequently, if the latch 938 is unlatched but the door 904 is in the position illustrated of FIG. 16, the hook 950 and tabs 914 and 920 are blocked from moving to the exterior of the enclosure by the blocking portions 918 and 924 as well as by the wire 952 coming into contact with the hook 950.

Figure 17:
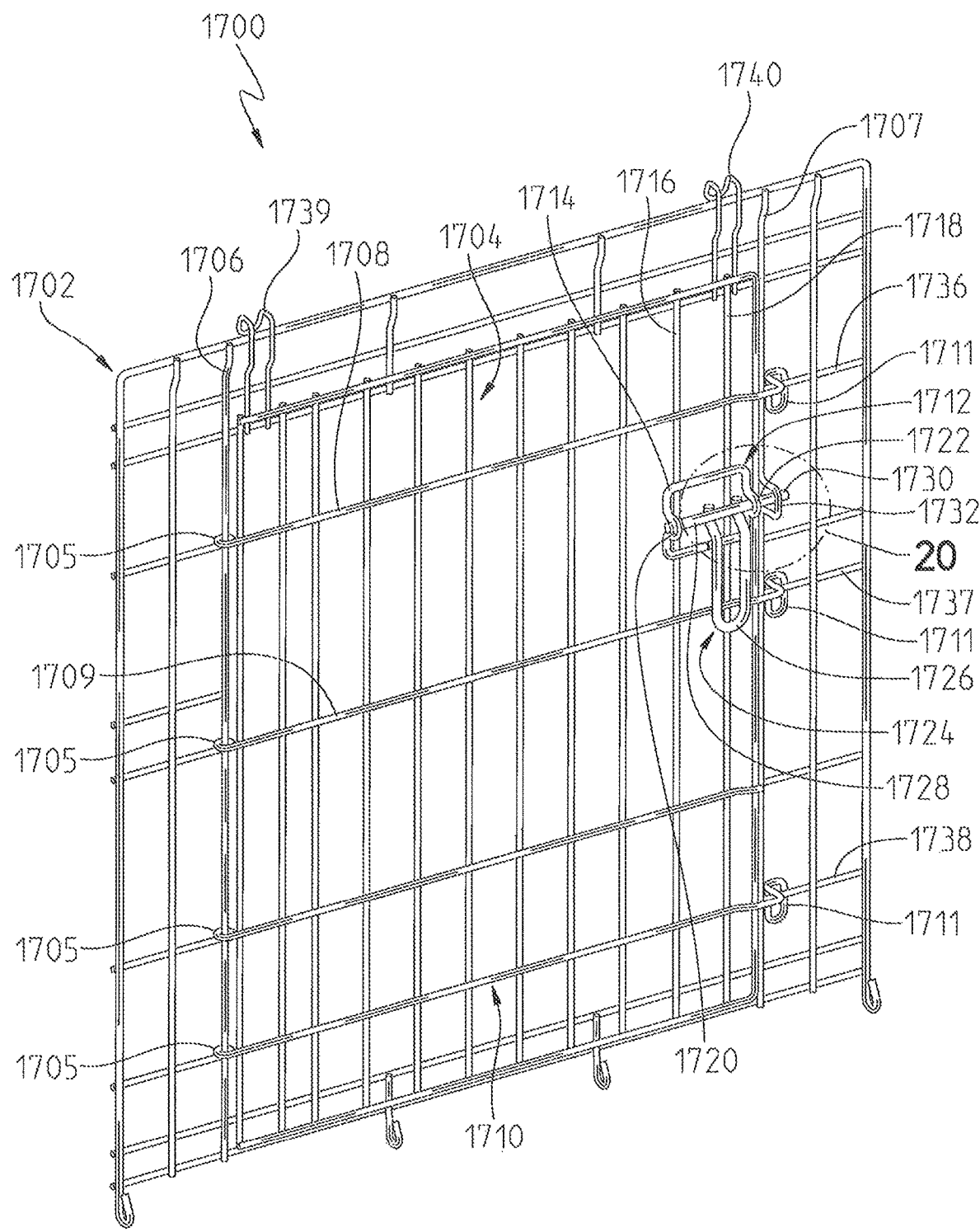
FIG. 17 is a perspective view of another embodiment of a door frame and door assembly.
Figure 18:
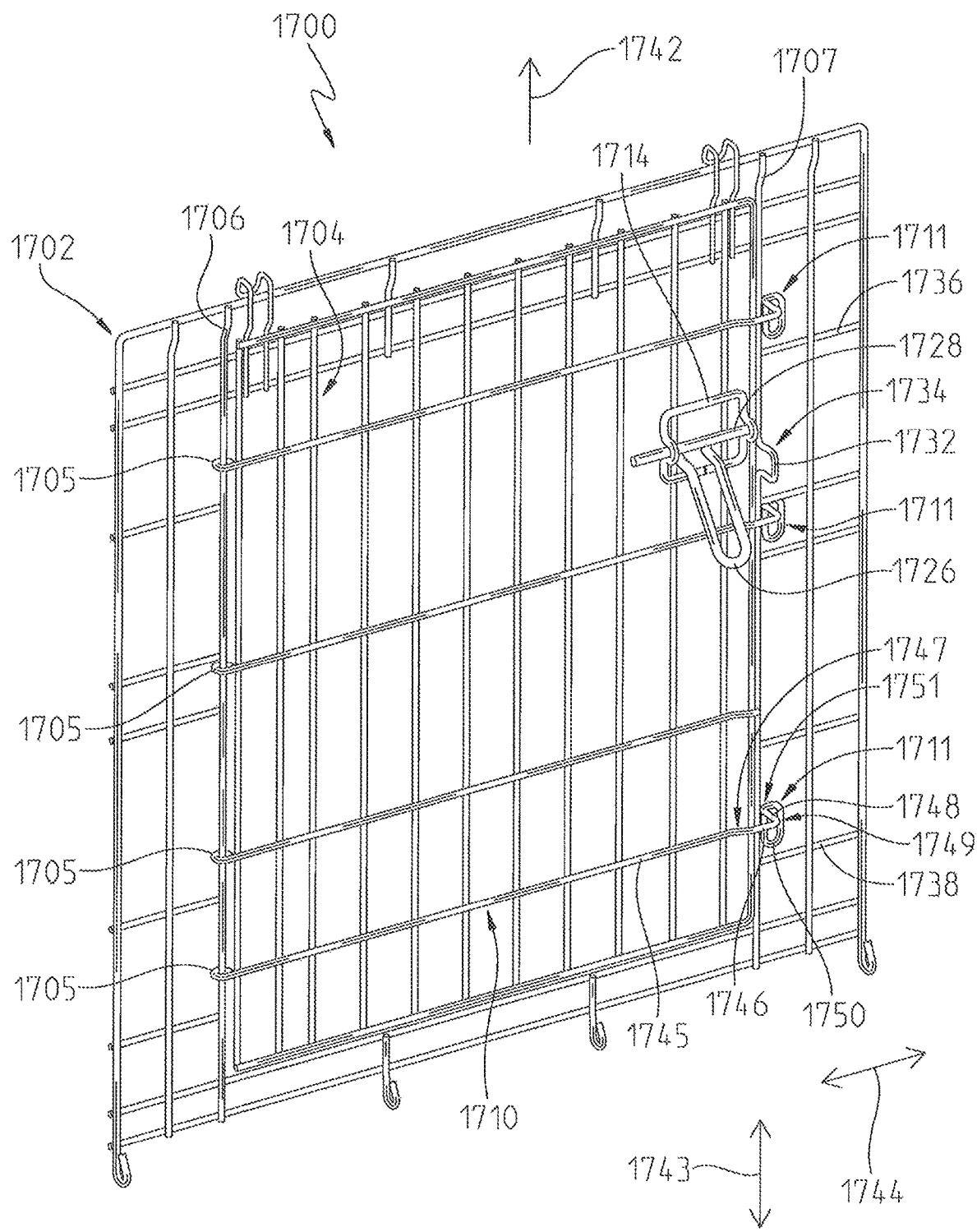
FIG. 18 is a perspective view of a latch of the door assembly of FIG. 17 in an unlatched position.
Figure 19:
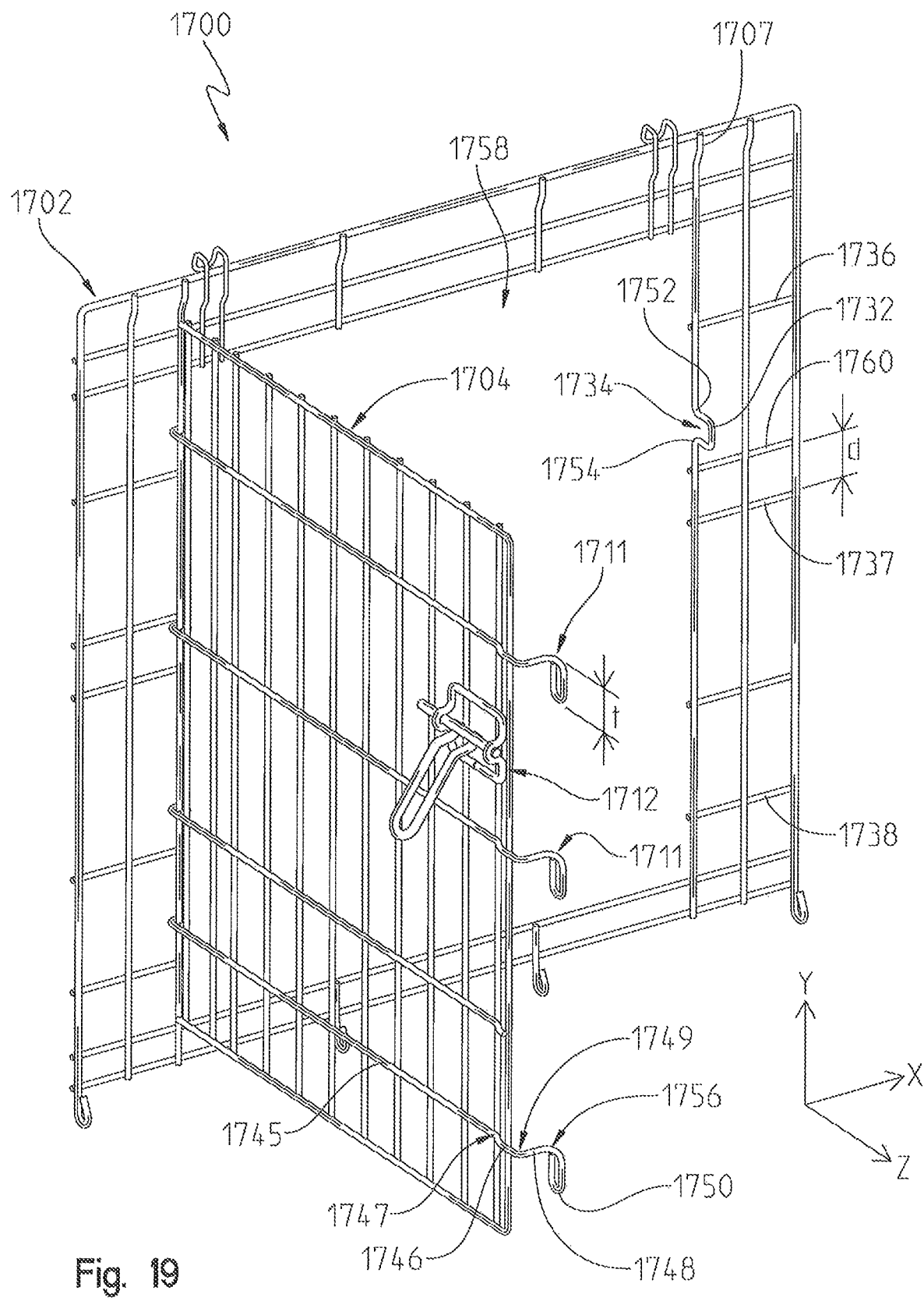
FIG. 19 is a perspective view of the door assembly of FIG. 17 in an open position.

FIG. 17 illustrates another embodiment of a door assembly 1700 including a frame 1702 and a door 1704. The frame 1702 and door 1704 may be formed by a plurality of interconnecting horizontal and vertical wires, as shown in FIG. 17, For purposes of this disclosure, a horizontal direction is indicated by arrow 1744 in FIG. 18, and a vertical direction is indicated by arrow 1743. Similar to several of the aforementioned embodiments, the door 1704 may include a plurality of hooked ends 1705 at one or more of its horizontal wires which surround a vertical wire 1706 of the frame 1702. The door 1704 can pivot about the vertical wire 1706 between a closed position (FIG. 17) and an open position (FIG. 19).

In this embodiment, a latch assembly 1712 is coupled to the door 1704 at a side area of the door opposite the pivoting portion defined by the hooked ends 1705. This is shown in FIG. 17 where the latch assembly 1712 is disposed at a right-hand side of the door 1704, and the door 1704 pivots at its left-hand side. This arrangement, however, can be different in other embodiments. For example, the door 1704 may swing in the opposite direction. Alternatively, it may swing open from its bottom or top edge. Any design may be used for the style of door shown in FIG. 17.

The latch assembly 1712 may include a support 1714 which is fixedly coupled to a first vertical wire 1716 and a second vertical wire 1718 of the door 1704. The support 1714 may be formed of wire and includes a first bent portion 1720 and a second bent portion 1722 each defining a space between the support 1714 and a plane defined by the horizontal and vertical wires forming the door 1704, The spaces formed by the two bent portions are axially aligned with one another in the horizontal direction 1744. Moreover, the spaces are configured to accept a moveable latch 1724 having a handle 1726 fixedly coupled to a pin 1728. Each of the spaces is sufficiently sized to enable sliding and rotational movement of the handle 1726 with respect to the support 1714.

An end 1730 of the pin 1728 may extend past or beyond the support 1714 to engage a key hole assembly 1732 formed by the frame 1702. The key hole assembly 1732 may be formed by a frame vertical wire 1707 and define an aperture 1734 (see FIG. 19) which is configured to accept the end 1730 of the pin 1728 in a latched position. Sliding movement of the pin 1728 moves the end 1730 into and out of the aperture 1734. In view of this, the door 1704 may be coupled to the frame 1702 in a plurality of positions. For instance, the door 1704 may be disposed in a closed and latched position as shown in FIG. 17. In addition, the latch assembly 1712 may be actuated to its unlatched position so that the door 1704 is in its closed but unlatched position. In FIG. 19, the door 1704 is shown in its open and unlatched position. Other positions or configurations of the door 1704 will be described below.

In FIG. 17, the frame 1702 is shown including a first hook 1739 and a second hook 1740. In other embodiments, there may be fewer or additional hooks. In use, the hooks may engage a wire of a top member 102 of the enclosure assembly 100. Hooks may be disposed at the bottom and sides of the frame 1702 for coupling adjacent members of the overall assembly.

Figure 20:
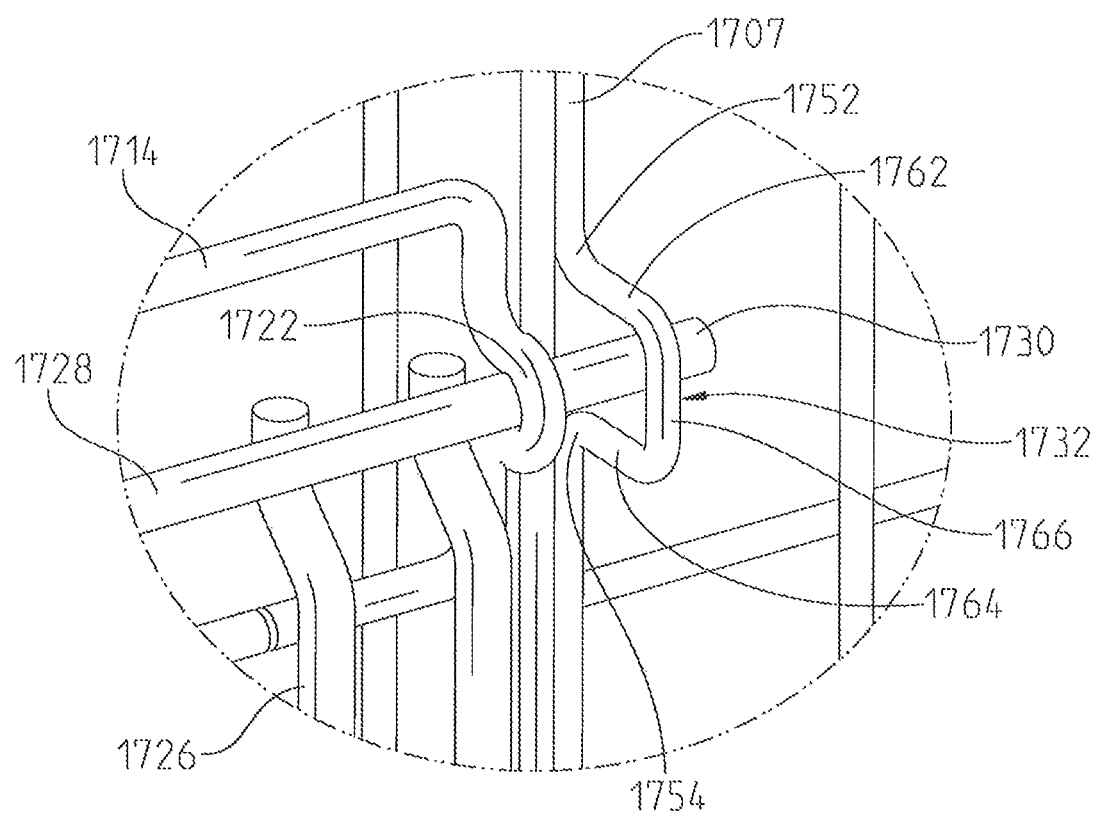
FIG. 20 is an enlarged perspective view of a key hole and latching assembly of the door assembly of FIG. 17.

As shown best in FIGS. 19 and 20, the key hole assembly 1732 may be formed from the vertical wire 1707 of the frame 1702 such that the door 1704 is able to move relative thereto. To form the key hole assembly 1732, the wire 1707 may be bent in a plurality of ways. For instance, the wire 1707 may include a first bend 1752 and a second bend 1754. A first wire portion 1762 extends outwardly from the plane defined by the horizontal and vertical wires of the frame 1702 such that the first wire portion 1762 may be substantially perpendicular to said plane. The first wire portion 1762 extends outwardly to its defined orientation from the first bend 1752. A second wire portion 1764 extends outwardly from the same plane in a substantially perpendicular manner as well. As such, the first and second wire portions may be parallel but vertically offset from one another. A third wire portion 1766 may connect with the first and second wire portions to form a substantially U-shaped structure. This substantially U-shaped structure defines the aperture 1734. The spacing between the first wire portion 1762 and the second wire portion 1764 is such that the end 1730 of the pin 1728 may freely pass into and out of the aperture 1734 without contacting or being restricted from movement by the wire portions.

Even when the latch assembly 1712 is disengaged or moved to its unlatched position, the door 1704 may still remain in the closed position. An animal contained within the enclosure assembly, such as a dog, may be unable to open the door therefore even if the latch assembly 1712 is disengaged due to the assembly 1700 including a plurality of tab assemblies 1711. As shown in FIG. 17, a tab assembly 1711 may be formed by a horizontal wire of the door 1704. In this embodiment, a tab assembly 1711 is formed by a first horizontal wire 1708 of the door 1704, a second horizontal wire 1709 of the door 1704, and a third horizontal wire 1710 of the door 1704. In another embodiment, there may be one or more tab assemblies 1711 for engaging the frame 1702 in the closed position. In another embodiment, each of the horizontal wires forming the door 1704 may include a hooked end 1705 at one end of the respective wire and a tab assembly 1711 at an opposite end thereof.

The frame 1702 may include a plurality of horizontal wires that are configured to be engaged by the tab assemblies 1711. In FIG. 17, for example, the frame 1702 may include a first horizontal wire 1736, a second horizontal wire 1737, and a third horizontal wire 1738. Each of these respective horizontal wires may be engaged by a tab assembly 1711 of the door 1704 in the closed position.

As previously described, each tab assembly 1711 may be formed of a single wire of the door 1704. As shown in FIGS. 18-19, the wire may include a plurality of different portions. For instance, the third horizontal wire 1710 of the door 1704 is shown in FIGS. 18 and 19 as including a first portion 1745, a second portion 1746, a third portion 1748, and a tab body 1750. The tab body 1750 may form a downward turned hook for engaging a wire of the frame 1702. The first portion 1745 may be aligned and coaxial with the wire 1710 such that it is positioned within a plane defined by the horizontal and vertical wires of the door 1704. The second portion 1746, however, is disposed offset from the first portion 1745 by a first bend 1747 in the wire. In particular, the second portion 1746 is substantially parallel to the first portion 1745 but non coaxial. In other words, the horizontal wire 1710 may define an axis through which the first portion 1745 is coaxial with, but which the second portion 1746 is parallel to but offset from. Moreover, the second portion 1746 is offset or spaced from the plane defined by the door 1704.

As the second portion 1746 is connected to the first portion 1745 by the first bend 1747, the second portion 1746 may be connected to the third portion 1748 by a second bend 1749. As shown in FIG. 19, the third portion 1748 may be substantially perpendicular to the first and second portions. As such, the third portion 1748 may be perpendicular to the axis defined by the horizontal wire 1710 and the plane defined by the door 1704.

As shown in the illustrated embodiment, the horizontal wire 1710 is disposed on an outside or exterior of the door 1704. With reference to FIG. 19, the vertical wires may be oriented in a vertical direction 1743 or y-direction, and the horizontal wires may be oriented in a horizontal direction 1744 or x-direction. The outside or exterior direction may coincide with the z-direction, as shown in FIG. 19. In other words, when the door 1704 is closed, the enclosure assembly defines an interior. When the door 1704 is in its open position in FIG. 19, the frame 1702 defines an opening 1758 through which an animal may enter or exit the enclosure. For purposes of this disclosure, when exiting from the enclosure, the animal may pass through the opening 1758 in a direction indicated by the z-direction.

In view of the above, the horizontal wires of the door 1704 are connected to the vertical wires of the door 1704 along an outside surface of the door 1704, i.e., the horizontal wires are disposed in the z-direction relative to the vertical wires. With the horizontal wires being located outside or the exterior of the vertical wires, the third portion 1748 of the horizontal wire 1710 connects with the second bend 1749 at a location offset and to the outside of the plane defined by the door 1704. The third portion 1748 may have a length such that it passes through the plane defined by the door 1704 and extends past the door 1704 in the direction opposite the z-direction. In effect, this allows the tab body 1750, which is connected to the third portion 1748 via a fourth bend 1756 in the wire, to be positionable behind or towards the interior of the horizontal wire 1738 of the frame 1702 in the closed position. This is shown in FIGS. 17 and 18 where the tab body 1750 is disposed behind the horizontal wire 1738, i.e., into the interior of the enclosure assembly relative to the horizontal wire 1738.

The spacing between horizontal wires of the frame 1702 is such that the door 1704 can move in the vertical direction 1743 relative thereto to disengage or release each tab assembly 1711 from the frame 1702. In FIG. 19, for example, the tab body 1750 of each tab assembly 1711 may have a height "t". This height "t" may be formed by the wire being curled to form the tab body 1750 in a substantially circular or "O-shaped" design. The end of the wire may be disposed directly beneath the fourth bend 1756 of the tab assembly 1711.

In this embodiment, the height "t" of the tab body 1750 is less than the spacing between directly adjacent horizontal wires of the frame. In FIG. 19, the spacing "d" between the second, horizontal wire 1737 of the frame 1702 and a fourth horizontal wire 1760 of the frame 1702 is greater than the height "t" of the tab body 1750. In one embodiment, the spacing "d" may be twice the height "t". In a second embodiment, the spacing "d" may be 1.5 times greater than the height "t". In another embodiment, the spacing "d" may be between 1-1.5 times greater than the height "t". In any event, the spacing "d" is greater than the height "t" to allow the door 1704 to pivot from its closed position to its open position.

When opening the door 1704 from its closed position (FIG. 17) to its open or partially open position (FIG. 19), a user may slide the handle 1726 of the latch assembly 1712. In a horizontal direction away from the key hole assembly 1732. Once the end 1730 of the pin 1728 slides through the aperture 1734 and past the key hole assembly 1732 in a direction towards the vertical wire 1706, the door 1704 is in its closed, unlatched position. From this position, the user can pivot the handle 1726 about a pivot axis defined by the pin 1728, as shown in FIG. 18. As the handle 1726 is pivoted, the user can lift up on the handle 1726 or door 1704 in a direction indicated by arrow 1742. The hooked ends 1705 of the respective horizontal wires of the door 1704 may slide or move along the vertical wire 1706 of the frame 1702. This upward movement of the door 1704 may be limited or restricted by the placement or location of horizontal wires of the frame 1702 that may be engaged or contacted by the hooked ends 1705.

As the door 1704 is moved in the direction 1742 shown in FIG. 18, each tab assembly 1711 may likewise move in the same direction. At some point along the travel in the direction 1742, each tab assembly 1711 may be aligned with respect to the horizontal wires 1736, 1737, 1738, 1760 of the frame 1702 such that the door 1704 can be pivoted away from its closed position. In other words, each tab assembly 1711 may be aligned with respect to the frame 1702 such that each tab body 1750 may move between adjacent horizontal wires of the frame 1702 to enable the door 1704 to pivot from its closed position to a partially or fully open position. Once the door 1704 pivots to its partially open position and each tab assembly has moved past or cleared the frame 1702, the door 1704 can move in a vertical direction opposite arrow 1742 such that the hooked ends 1705 slide or move along the vertical wire 1706 to a down or rest position. This down or rest position may be achieved when one of the hooked ends 1705 engages or comes into contact with a corresponding horizontal wire of the frame 1702. Other mechanisms or means may be used for achieving the rest position.

In one non-limiting example of the illustrated embodiment of FIG. 17, the position or location of each tab assembly 1711 and the latch assembly 1712 with respect to the frame 1702 and door 1704 is such that the door 1704 is disposable in the latch position only when at least one tab assembly 1711 is disposed behind a corresponding horizontal wire of the frame 1702. In other words, the orientation and design of each tab assembly 1711 is such that the door 1704 may not be aligned properly with the frame 1702 to allow the end 1730 of the pin 1728 to align with the aperture 1734 defined by the key hole assembly 1732. This can provide a mechanical safety feature whereby a user may be unable to latch the door 1704 in its closed and latched position if the tab assemblies 1711 are not properly disposed behind the respective horizontal wires of the frame 1702.

The enclosure of FIG. 1 can be collapsed to a compact or stored structure. To do so, clips or fasteners are used, in different embodiments, for coupling each of the members to one another in the assembled position (FIG. 1). In other embodiments, relatively stiff wires acting as rods are threaded through hooks coupled to the members to secure the members in the appropriate locations. By removing the clips, fasteners, and or rods, the enclosure can be folded like an accordion to a compact position. In another aspect, each of the members may be hingedly or pivotally coupled to adjacent members and the entire enclosure can be folded or collapsed in an accordion-like manner.

Moreover, while the embodiments illustrated in this application relate to a wire crate whereby each side is formed by a plurality of interconnecting horizontal and vertical wires, this disclosure is applicable to other animal crates. For example, a plastic crate with a top, bottom, and sides formed of a plastic material may utilize a door and/or door frame as described herein. The plastic crate may have a design of any conventional style crate.

In another embodiment, other materials besides plastic may be used to form an animal enclosure that includes a door and door frame as described herein. Thus, the top, bottom, and sides may be formed of any material (plastic, wire rod, etc.) and include at least one door frame and door as described and shown in the embodiments herein.

Figure 21:
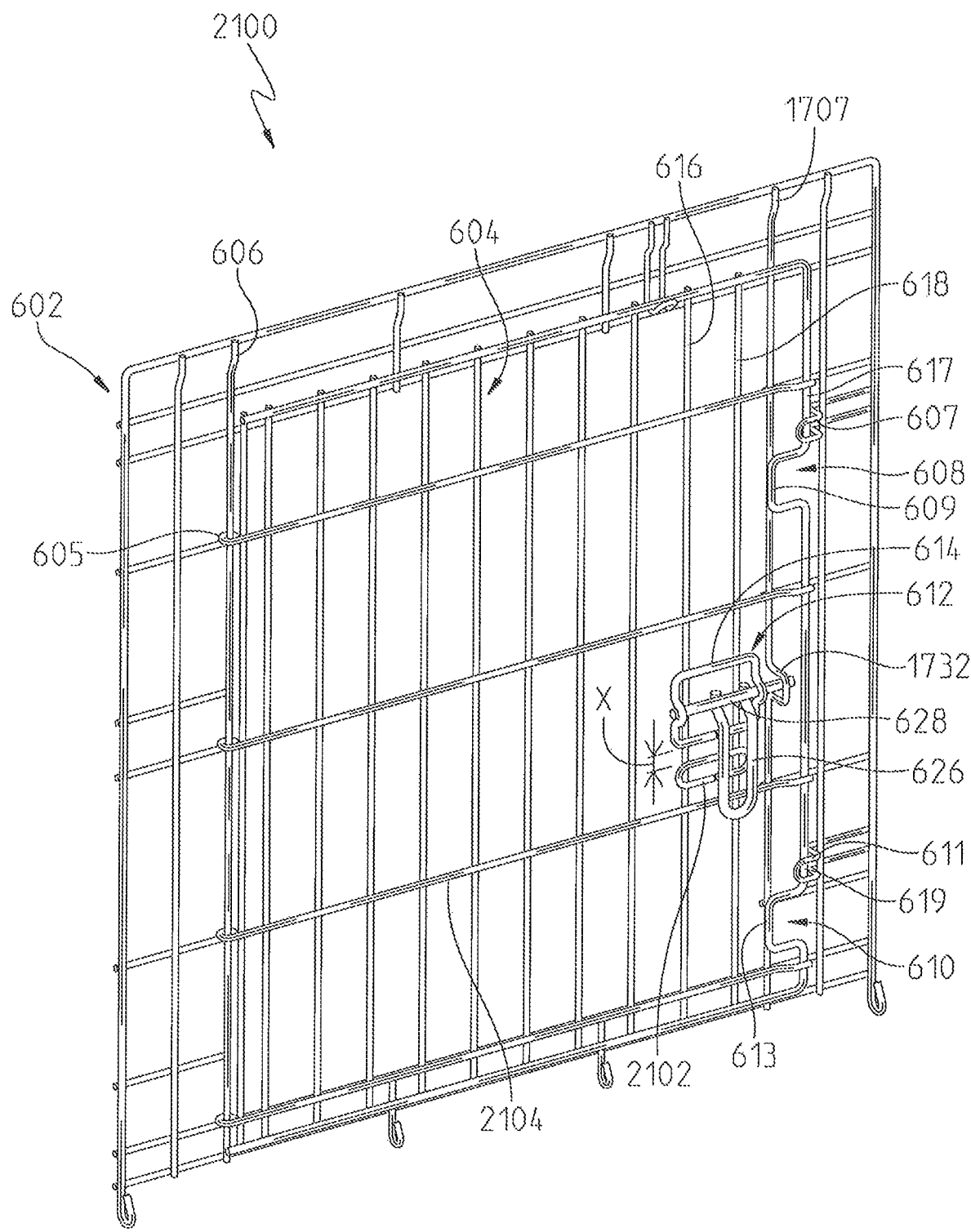
FIG. 21 is a perspective view of a door assembly with one embodiment of a blocking member.

In a further embodiment illustrated in FIG. 21, a door assembly 2100 is shown with a door frame 602 and a door 604. The door 602 and door frame 604 are similar to those depicted in FIG. 8. The door assembly 2100 may be formed by a plurality of horizontal and vertical interconnected wires. The door 604 may include a plurality of hooked ends formed by horizontal wires that engage a vertical wire 606 of the frame 602. As such, the door 604 is able to pivot about the vertical wire 606 between an open and closed position.

The door may include a first door stop 608 and a second door stop 610 that correspond with a first tab 607 and a second tab 611, respectively, of the door frame 602. The manner in which the door stops and tab interact with one another may be similar as shown in FIG. 8 and described above.

In addition, the door assembly 2100 may include a slide bolt latch assembly 612 with similar features as described above. The latch assembly 612, for example, may include a support 614 that is coupled to the door 604 via a first vertical wire 616 and a second vertical wire 618. A pin or bolt 628 may be slidably and pivotably coupled to the support 614. A handle 626 may be coupled to the bolt 628 to enable movement of the bolt from a latched position and an unlatched position. In the latched position, the bolt 628 may pass through an opening defined in a keyhole assembly 1732. The keyhole assembly 1732 may be formed by a vertical wire 1707 of the door frame 602. If the frame 602 is defined in a plane, the vertical wire 1707 may protrude outwardly from the plane as shown in FIG. 21 to define the opening through which the bolt 628 may enter in the latched position. The lever or handle 626 may be slid laterally to move the bolt 628 between its latched and unlatched position. The lever or handle 626 may also be pivoted about an axis defined through the bolt 628 such that the lever or handle 626 may be pivoted outwardly away from the door 604.

In the embodiment of FIG. 21, a blocking member 2102 may also be provided. The blocking member 2102 may be coupled to the door 604 at a location that is below the support 614 by a distance X. The blocking member 2102 may be disposed at a location on the door 604 such that the handle or lever 626 contacts the blocking member 2102 in a rest or downward position (as shown in FIG. 21). In other words, rather than the handle or lever 626 contacting a horizontal wire of the door 604, in the illustrated embodiment of FIG. 21 the handle or lever 626 may rest against or contact the blocking member 2102.

In one example, the blocking member 2102 may be disposed at a location on the door that is approximately half the distance from the lowermost portion of the support 614 and the lowermost portion of the handle or lever 626. Alternatively, the blocking member 2102 may be disposed at a location that is approximately half way between the lowermost portion of the support 614 and the horizontal wire of the door that the handle or lever 626 would otherwise come into contact with (i.e., horizontal wire 2104 of FIG. 21).

The position or location of the blocking member 2102 may be any location on the door 604 such that it spans at least an opening or width defined between the first vertical wire 616 and second vertical wire 618, and it is in contact with the handle or lever 626 in the rest position. The blocking member 2102 may span more than only two vertical wires, and in some embodiments, it may span the entire width of the door 604. In FIG. 21, the blocking member 2102 may be coupled in at least one location to the first and second vertical wires. For example, it may be welded, adhered, mechanically fastened, or coupled in any known manner. As such, a crated animal is unable to use a body part (e.g., paw, nose, etc.) to contact or otherwise touch the handle or lever 626, Instead, the blocking member 2102 prevents such contact in the illustrated embodiment, and can prevent any possible unlatching of the latch assembly 612.

Figure 22:
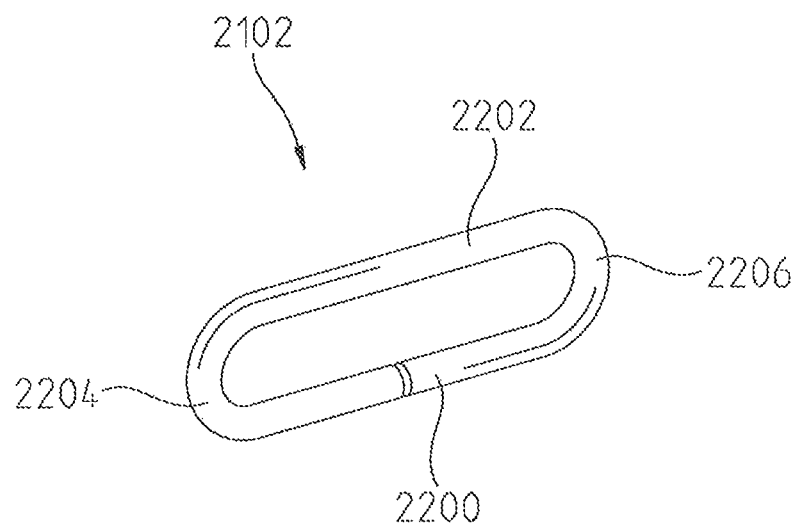
FIG. 22 is a perspective view of the blocking member of FIG. 21.
Figure 23:
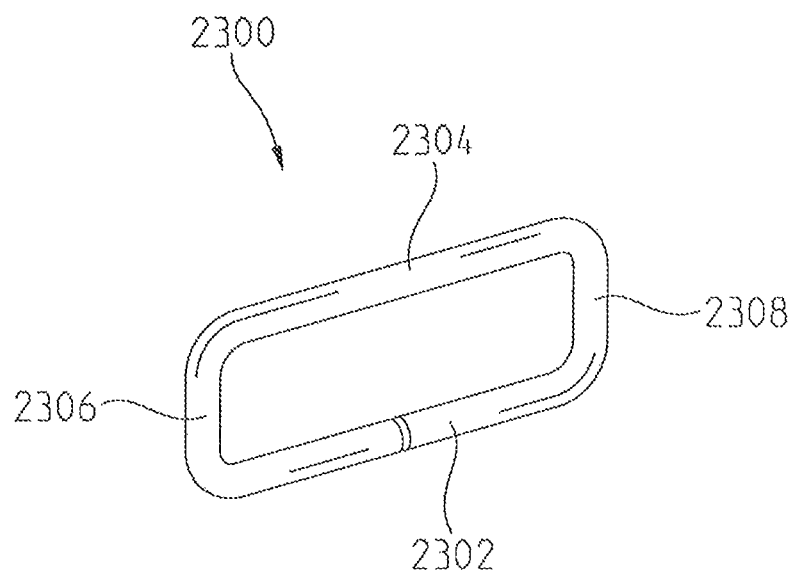
FIG. 23 is a perspective view of another embodiment of a blocking member.

The blocking member 2102 may be any shape or size. In FIG. 22, the blocking member 2102 is shown as an oval-shaped body 2200. The oval-shaped body 2200 may include an elongated portion 2202 with a first curved portion 2204 and a second curved portion 2206. The body 2200 may be formed by a single wire having two distinct ends, as shown in FIG. 22. Alternatively, it may be a wire without two distinct ends. Further, the blocking member may be formed by other types of material such as plastic, wood, or any known type of material.

In another embodiment, a blocking member 2300 may have a substantially rectangular or square-shaped body 2302. Here, the body 2302 may include a longitudinal portion 2304 integrally formed with a first square end 2306 and a second square end 2308. Other shapes including circular, polygonal, triangular, etc. is possible for the blocking member.

Figure 24:
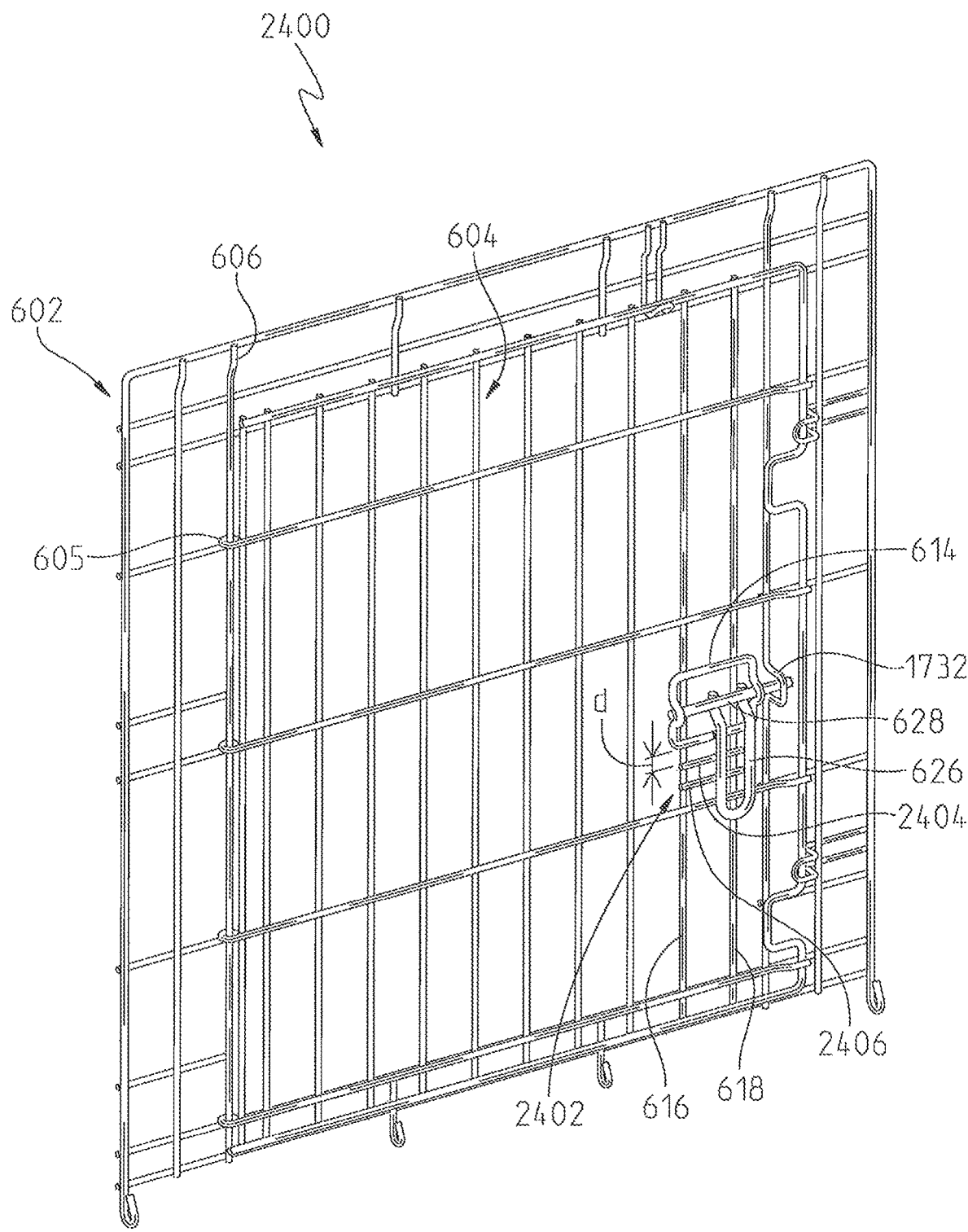
FIG. 24 is a perspective view of a door assembly with a further embodiment off a blocking member.

Referring to FIG. 24, a further embodiment of a door assembly 2400 is shown with a blocking member 2402. The door frame 602 and door 604 are substantially the same as that described above in at least FIGS. 8 and 21. Here, the blocking member 2402 may be formed by a first wire 2404 and a second wire 2406. The first and second wires may be spaced vertically from one another, and each wire may be coupled to the door 604 via the first vertical wire 616 and the second vertical wire 618. The first wire 2404 may be spaced vertically from the support 614 by a distance d, as shown in FIG. 24. The handle or lever 626 may again contact one or both wires of the blocking member 2402 in the rest or downward position. The first wire 2404 and second 2406 may further prevent a crated animal from contacting or moving the lever or handle 626.

While in FIG. 24, the blocking member is shown as including two wires, it is further possible to include a single, thick wire. Alternatively, there may be two or more wires forming the blocking member. While not shown, the blocking member may be formed by a plate having any desirable thickness. In other words, the blocking member may take any size, shape or thickness, and it may be coupled to the door 604 at a location below the support 614. The blocking member further is in contact with the handle or lever 626 when the handle or lever is in its downward position as shown in FIG. 24.

While exemplary embodiments incorporating the principles of the present disclosure have been disclosed herein, the present disclosure is not limited to the disclosed embodiments. Instead, this disclosure is intended to cover any variations, uses, or adaptations of the disclosure using its general principles. For instance, other embodiments incorporating sliding movement of a door with respect to a frame to locate the features of the door stop in an aligned position which enables pivoting movement of a door are included. In addition, while different embodiments of the door frame and door assemblies are described with respect to the enclosure of FIG. 1, the described door frame and door assemblies are not limited in use with the described enclosure, but can be used with other enclosures. Further, this application is intended to cover such departures from the present disclosure as come within known or customary practice in the art to which this disclosure pertains and which fall within the limits of the appended claims.

The invention claimed is:

1. An animal enclosure, comprising:
a plurality of members defining an interior of the enclosure, where the plurality of members includes at least a first member;
a frame of the first member having a plurality of interconnected wires that define an opening for an animal to pass therethrough and to enter or exit the interior of the enclosure;
a door of the first member having a plurality of interconnected wires and being coupled to the frame, the plurality of interconnected wires of the door comprising a plurality of horizontal wires wrapped around a pivot wire of the frame to move between an open position in which access to the opening is permitted and a closed position in which the door substantially covers the opening to restrict access to the opening, the plurality of interconnected wires of the door further including a plurality of vertical wires each spaced from the pivot wire in a horizontal direction and having an outermost vertical wire that is spaced farther from the pivot wire in the horizontal direction than any other vertical wire of the plurality of vertical wires, the plurality of interconnected wires of the door defining a plane;
a latch assembly for releasably coupling the door to the frame in the closed position;
a first vertical wire of the plurality of interconnected wires of the frame spaced from the pivot wire and located nearest the outermost vertical wire of the door in the closed position, where the first vertical wire forms an aperture for receiving the latch assembly when the door is in the closed position; and
a plurality of tabs each comprising a first portion, a second portion, a third portion, and a body portion, the first portion being coaxial with one of the plurality of horizontal wires of the plurality of interconnected wires of the door and disposed within the plane, the plurality of tabs comprising at least a first tab and a second tab spaced vertically from one another, wherein the latch assembly is located between the first and second tabs;
wherein, in the closed position, the body portion of the first tab is positioned behind a first horizontal wire of the plurality of interconnected wires of the frame and is disposed into the interior relative to the first horizontal wire, the body portion of the second tab is positioned behind a second horizontal wire of the plurality of interconnected wires of the frame and is disposed into the interior relative to the second horizontal wire, and for each of the first and second tabs, the second portion is offset in an exterior direction from both the plane and an adjacent portion of the first vertical wire of the plurality of interconnected wires of the frame, wherein neither the first horizontal wire nor the second horizontal wire form a perimeter which defines a top or bottom of the opening formed in the frame;
wherein, the door is slidably and pivotally coupled to the pivot wire of the frame.

2. The animal enclosure of claim 1, wherein the first vertical wire forms a key hole assembly that defines the aperture and comprises a portion of the first vertical wire at a location between a first end and a second of the first vertical wire.

3. The animal enclosure of claim 2, wherein the key hole assembly comprises a first portion, a second portion, and a third portion, the first portion of the key hole assembly being integrally coupled with the first vertical wire via a first bend and the second portion of the key hole assembly being integrally coupled with the first vertical wire via a second bend.

4. The animal enclosure of claim 3, wherein:
the first vertical wire defines an axis;
the third portion of the key hole assembly is parallel to but offset from the axis; and
the first portion of the key hole assembly and the second portion of the key hole assembly are each perpendicular to the axis.

5. The animal enclosure of claim 2, wherein the first vertical wire is bent in at least four locations to form the key hole assembly.

6. The animal enclosure of claim 2, wherein the key hole assembly comprises a substantially U-shaped cross-section.

7. The animal enclosure of claim 1, wherein the latch assembly comprises a handle structure and a pin, where the handle structure is pivotable with respect to one of the door and the frame, and the pin is movable axially with respect to one of the door and the frame.

8. The animal enclosure of claim 7, wherein the pin defines a pivot axis about which the handle structure pivots relative to the door and the frame, the pivot axis passing through the aperture when the door is disposed in its closed position.

9. The animal enclosure of claim 1, wherein, for each of the first and second tabs, the body portion engages the frame in the closed position.

10. The animal enclosure of claim 9, wherein the body portion comprises a downward turned hook.

11. The animal enclosure of claim 9, wherein, in the closed position, the body portion is offset from the plane in a direction opposite to the exterior direction.

12. The animal enclosure of claim 9, further comprising:
a first bend formed between the first portion and the second portion; and
a second bend formed between the second portion and the third portion.

13. The animal enclosure of claim 9, wherein the third portion is disposed substantially perpendicular to the first and second portions.

14. The animal enclosure of claim 9, wherein the plurality of horizontal wires of the plurality of interconnected wires of the door each have a hooked end at a location opposite the body portion along the first horizontal wire, the hooked end overlapping and being vertically movable with respect to the pivot wire.

15. The animal enclosure of claim 9, wherein the body portion comprises a height, the height being less than a minimum distance between adjacent and parallel horizontal wires of the frame to enable the door to pivot between its open and closed positions.

16. The animal enclosure of claim 1, wherein the first tab and the second tab are located within the interior of the enclosure when the door is in the closed position.

17. The animal enclosure of claim 1, wherein the plurality of tabs each extend behind the first vertical wire when the door is in the closed position.

* * * * *